INVENTORS
ALAN M. EISENSTEIN
RICHARD F. MURRAY
BY Edgar H Kent
ATTORNEY

FIG. 2

| P | CODE | | PER | MODE | SELECTION | P | D I | I | INDEX REG | CONTROL WORD ADDRESS |
|---|------|---|-----|------|-----------|---|-----|---|-----------|----------------------|
| S | 6 | 7 | 8 10 | 11 17 | 18 23 | | 24 25 | 26 | 29 | 30 47 |

FIG. 3a

| P | IO WORD COUNT | P | STARTING ADDRESS |
|---|---------------|---|------------------|
| S 5 | 6 23 | 24 29 | 30 47 |

FIG. 3b

| P | IDENTITY | P | TAPE IDENTITY ADDRESS |
|---|----------|---|-----------------------|
| S 5 | 6 23 | 24 29 | 30 47 |

FIG. 3c

| P | | IO WORD COUNT | P | | STARTING ADDRESS |
|---|---|---------------|---|---|------------------|
| S 1 2 3 4 5 | 6 | 23 | 24 25 26 27 28 29 | 30 | 47 |

SEL. BITS PER BITS
(21-23) (8-10)

MODE BITS
(11-16)

FIG. 4

RELOCATE CYCLE
FOR TWO CONTROL WORDS

| CPE DECODE SLO | SLO 6 PCE SELECT | OBTAIN CW1 | STORE BW | STORE CBW | OBTAIN CW2 | STORE IABW |
|----------------|------------------|------------|----------|-----------|------------|------------|

← ONE MACHINE CYCLE →

RELOCATE CYCLE
FOR ONE CONTROL WORD

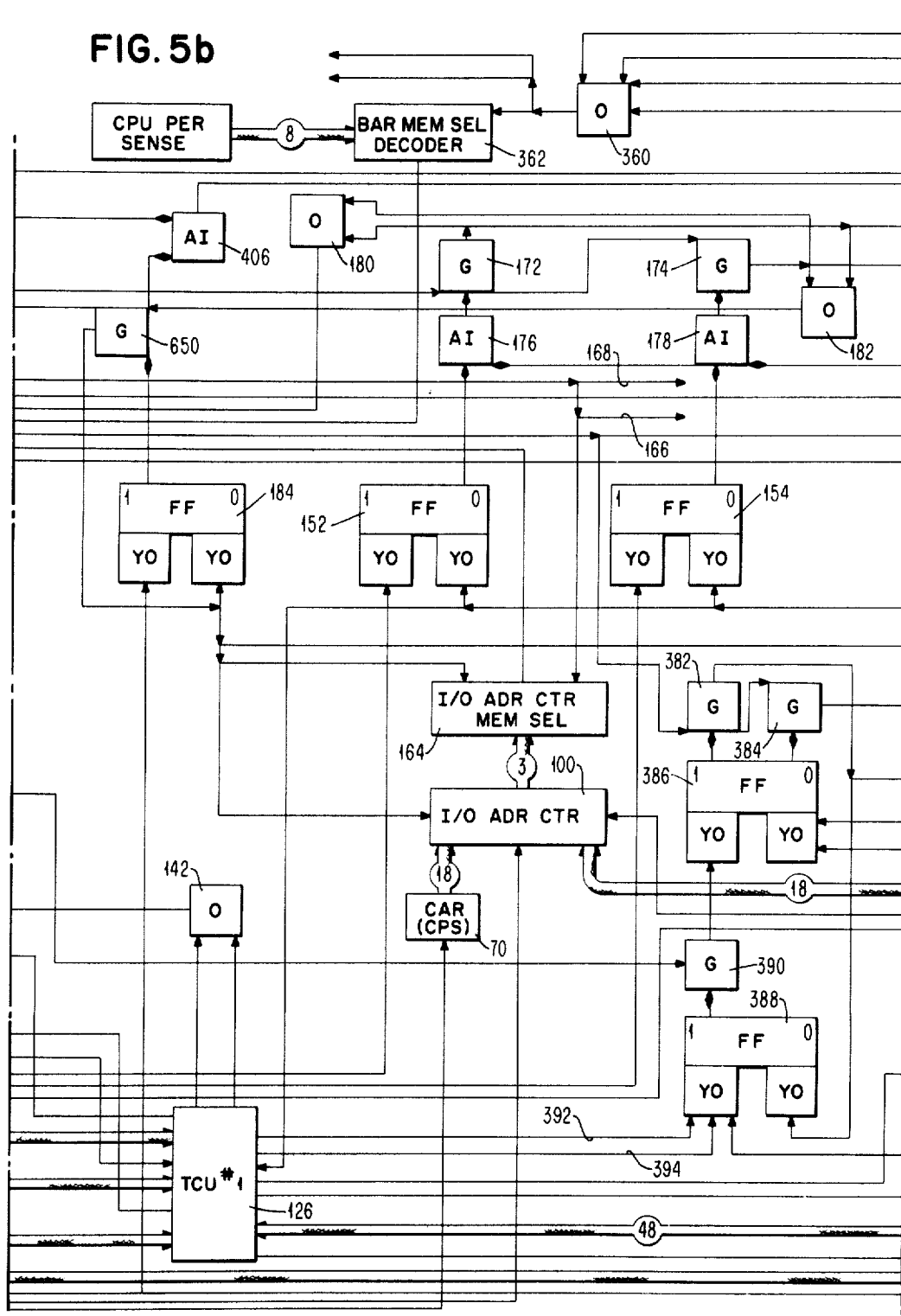

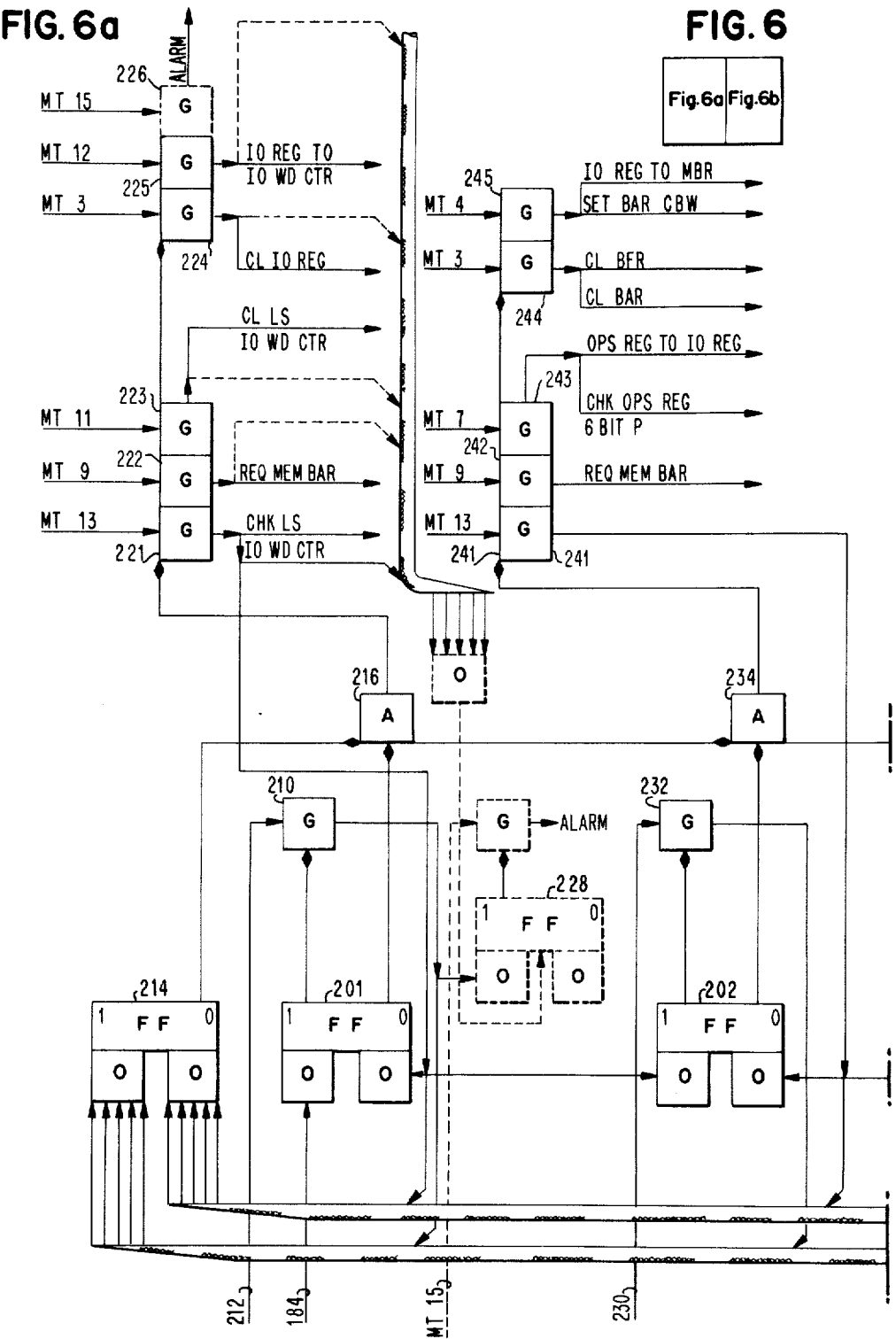

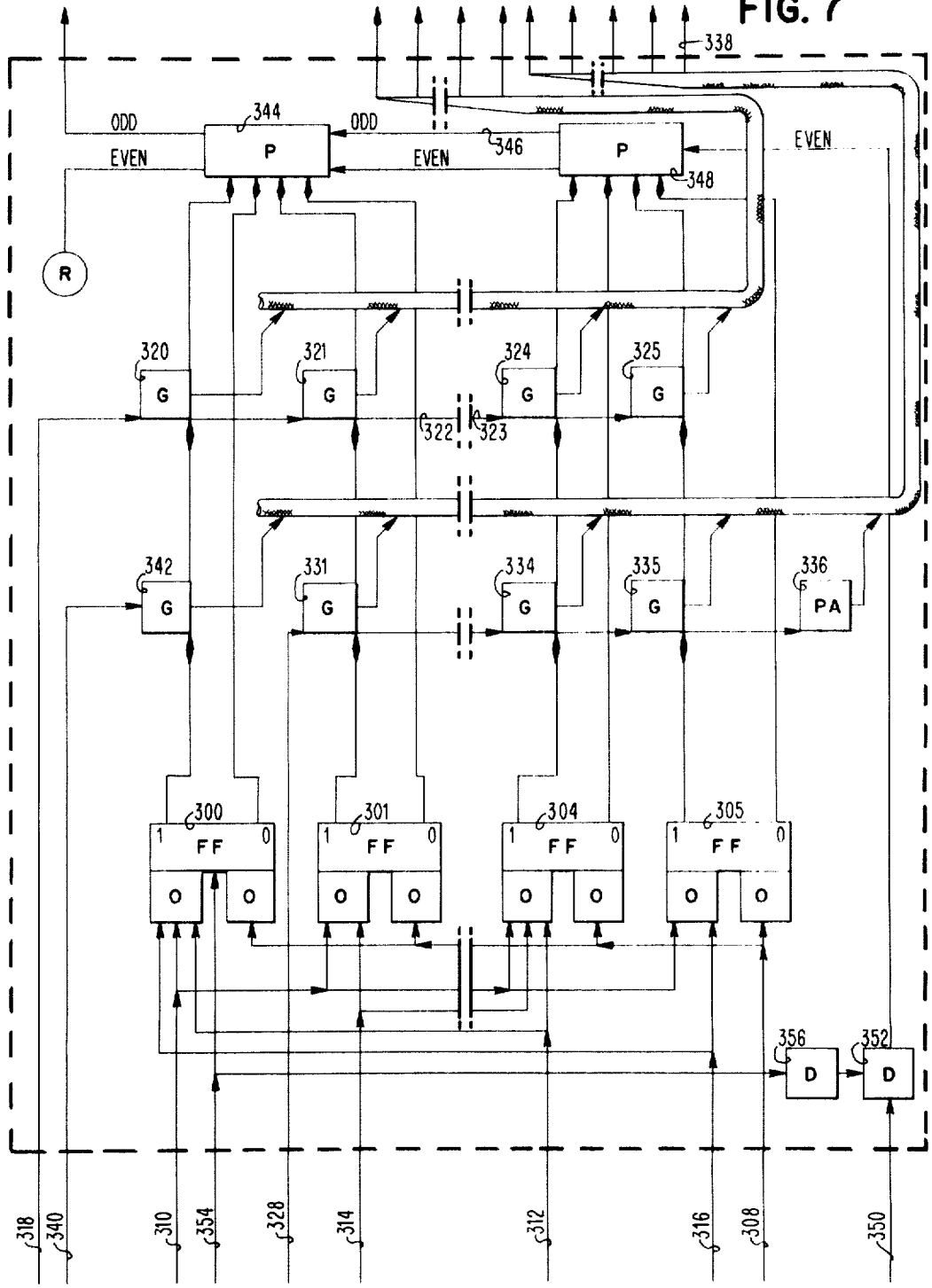

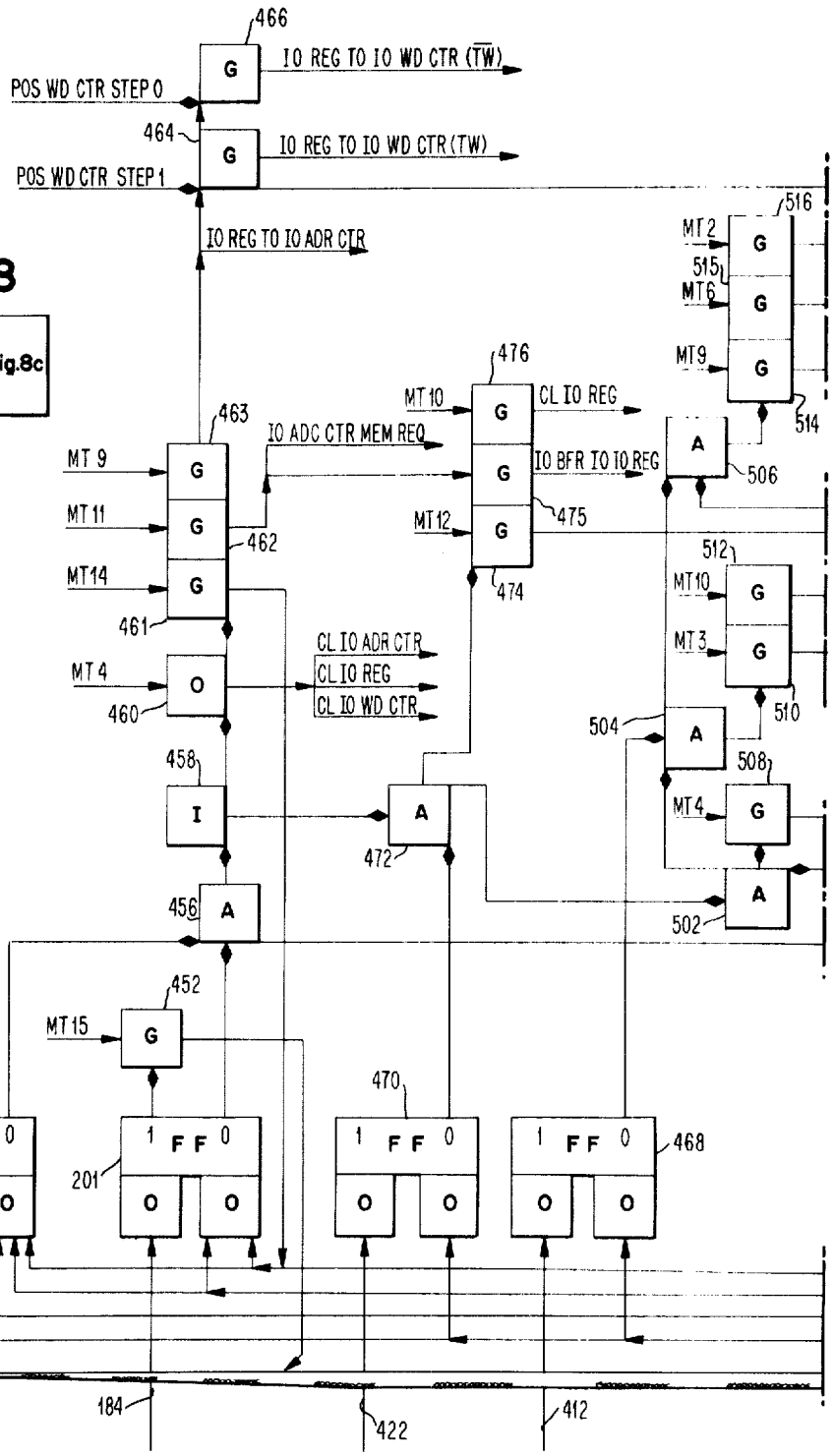

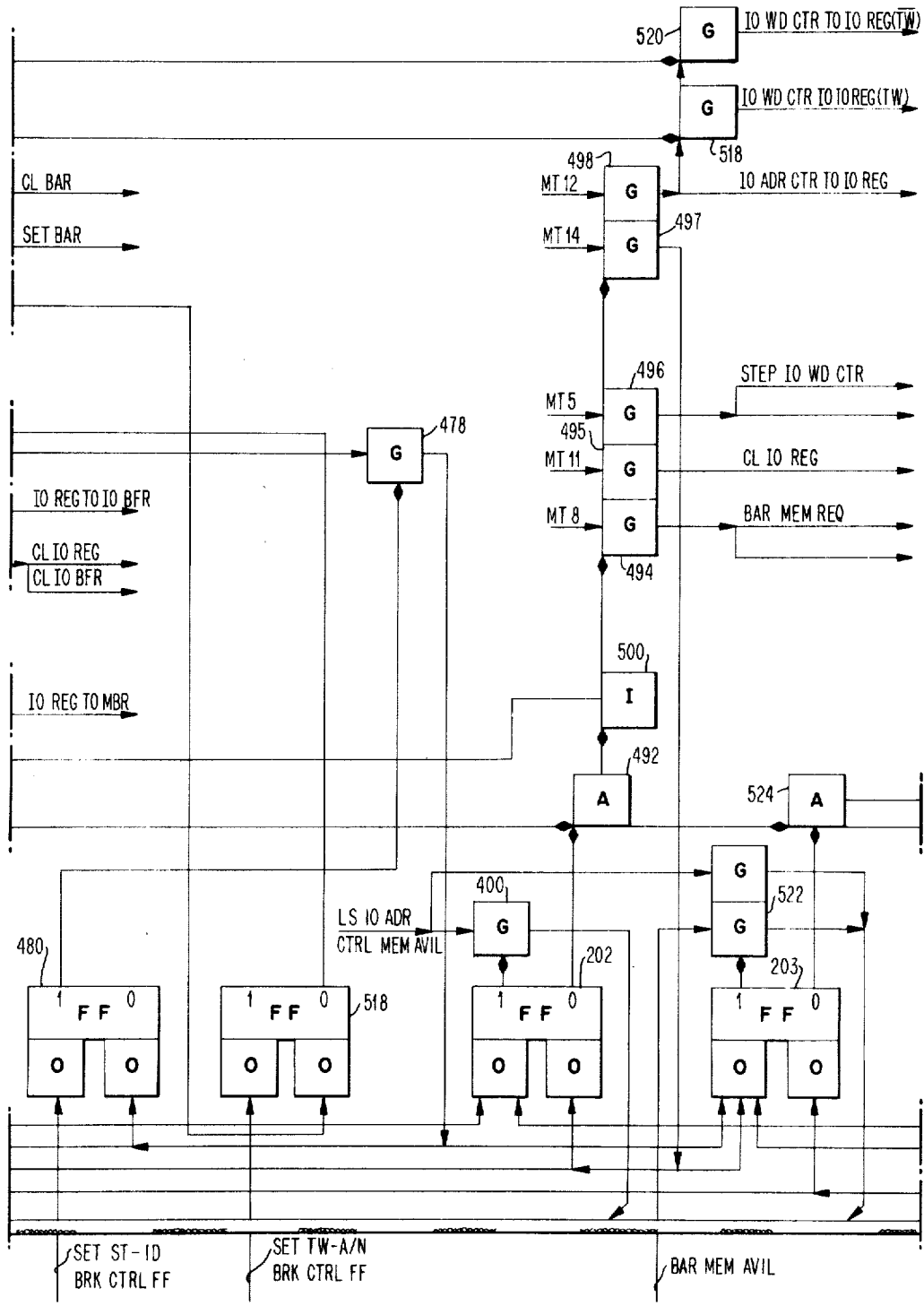

April 26, 1966   A. M. EISENSTEIN ETAL   3,248,701

DATA TRANSFER CONTROL SYSTEM

Filed Dec. 30, 1960   16 Sheets-Sheet 11

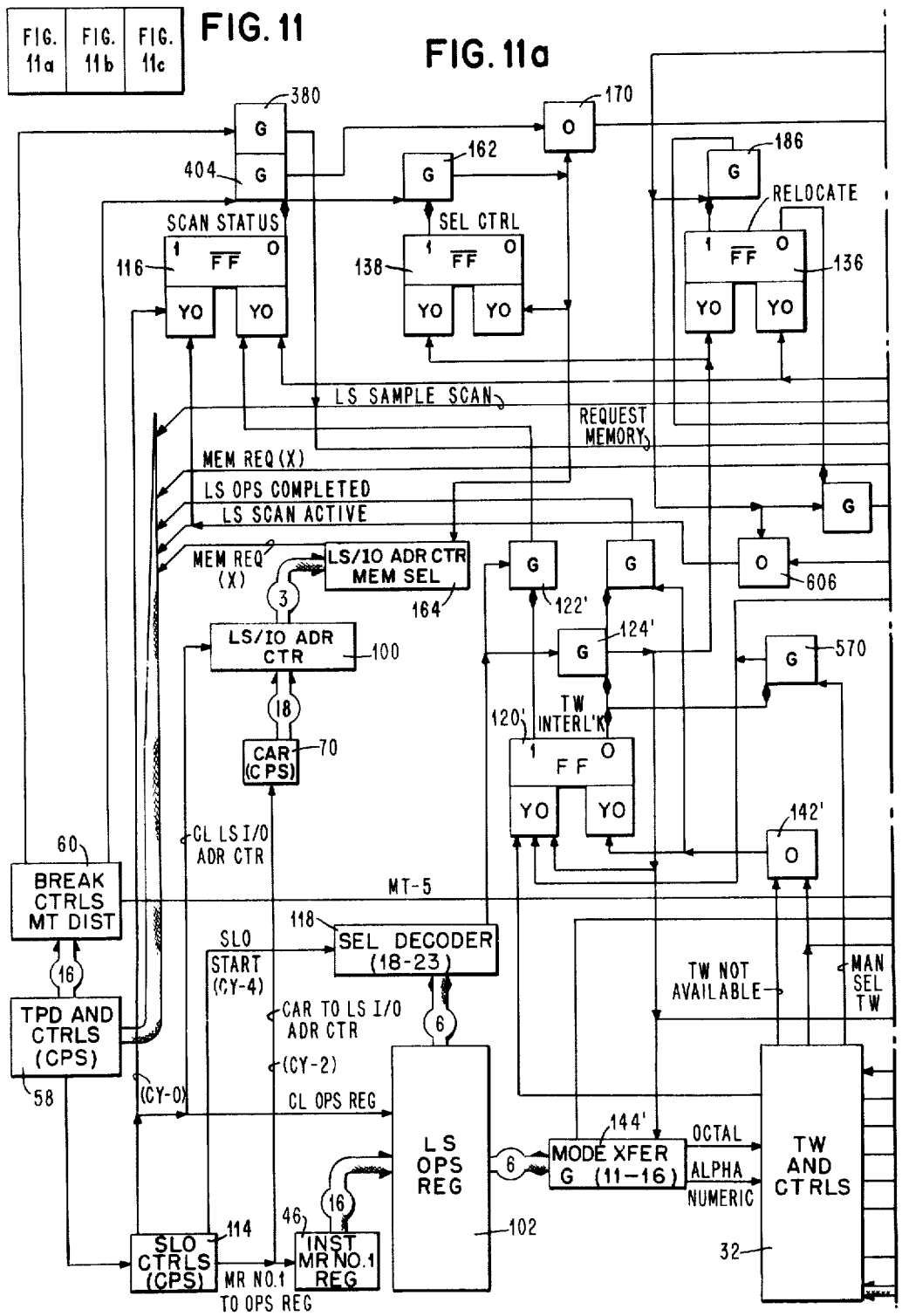

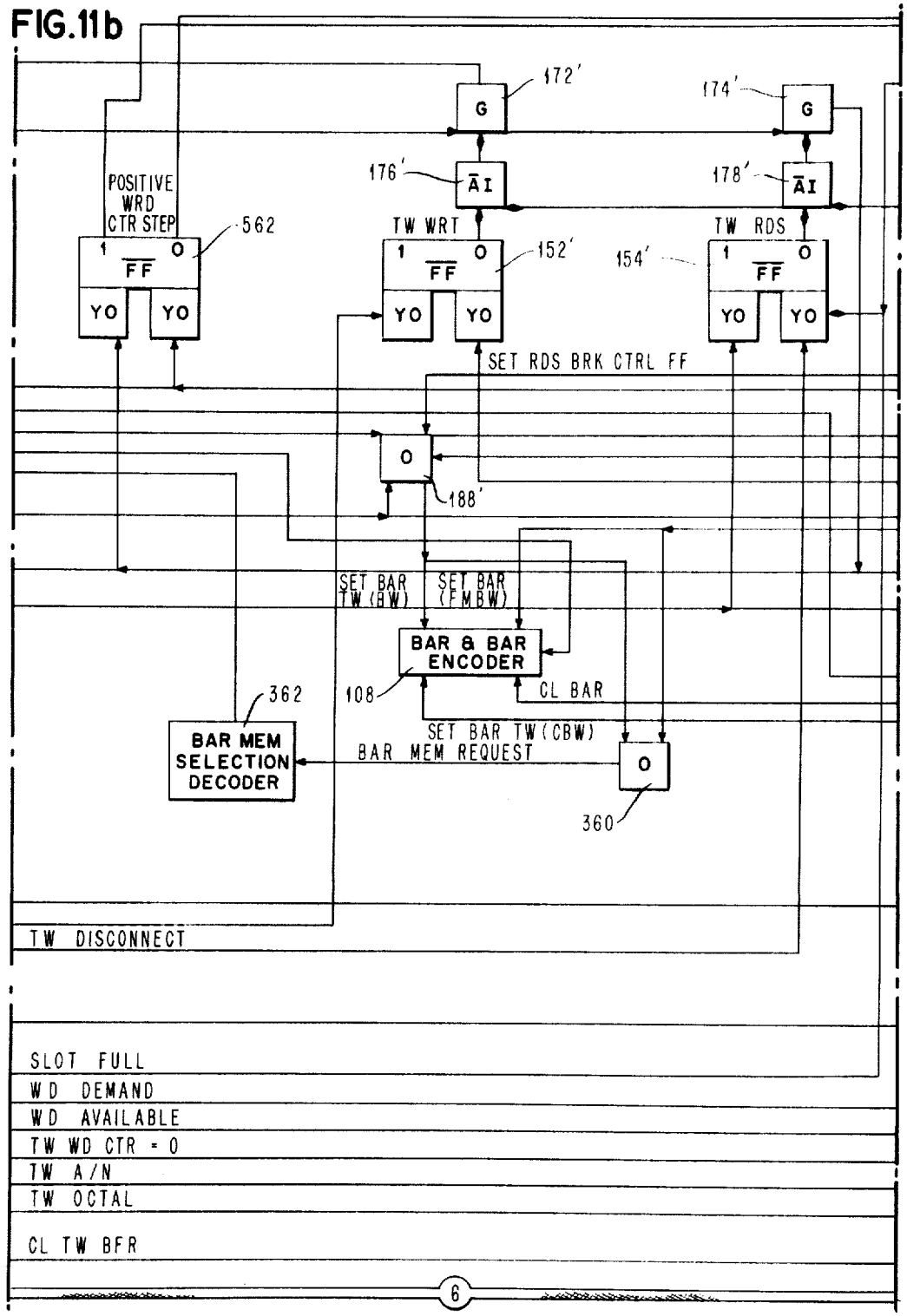

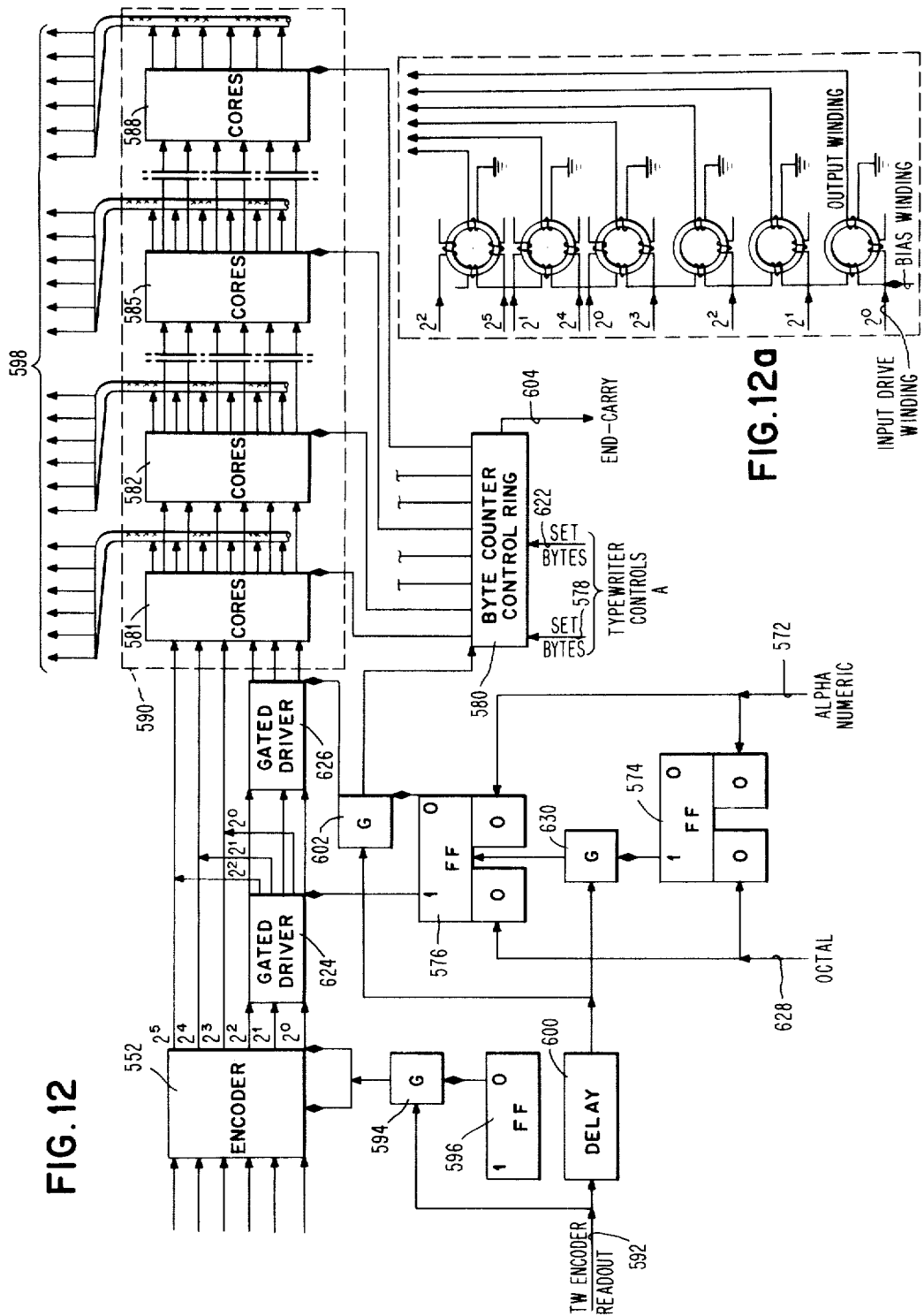

United States Patent Office  3,248,701
Patented Apr. 26, 1966

3,248,701
DATA TRANSFER CONTROL SYSTEM
Alan M. Eisenstein, Kingston, and Richard F. Murray, Rhinebeck, N.Y., assignors to International Business Machines Corporation, New York, N.Y., a corporation of New York
Filed Dec. 30, 1960, Ser. No. 79,447
5 Claims. (Cl. 340—172.5)

This invention relates to data processing systems in general and more particularly to improved data processing systems in which data transfers to and from a central processing element are controlled in accordance with a stored program of instructions for that processing element.

In the several types of data processing systems various techniques may be employed for controlling data transfers into and out of the central processing area. However, due to the different operating rates of the comparatively slow speed peripheral I/O equipments (such as drums, tapes, card readers, typewriters, etc.) and the usually high speed Central Processing Element (CPE) there must be some form of accommodation between those elements made so that the CPE may operate in the most efficient manner. Examples of such accommodation systems are disclosed in the co-pending patent applications S.N. 705,594 entitled Data Processing System, filed in the name of Robert H. Everett on Dec. 27, 1957, now Patent No. 3,037,192, and S.N. 79,809 entitled Data Processing Device, filed in the name of Richard F. Murray et al., on December 30, 1960. In the coordination of data transfers between the memory areas of the CPE and the peripheral I/O devices, the selected I/O device and its mode of operation must be identified. The amount of data to be transferred and the address in the memory area (and the address in the I/O device if meaningful) must also be specified. In programming the computer to perform input-output (I/O) operations, the system of the type disclosed in the aforementioned patent application S.N. 705,594 required programming of three instructions, two of which were preparatory and the third, an instruction of execution. Those instructions were a load I/O Address Counter instruction, a Select Instruction and either a Read or Write instruction. The number of words to be transferred was specified by the address portion of the Read or Write instruction. In the system disclosed in S.N. 79,809 simultaneous operation of both high speed and low speed I/O devices are enabled. In that system, however, two bookkeeping words (for the memory address and the word count) had to be loaded into preassigned memory areas by separate instructions as a preliminary operation; a Sense instruction was then utilized to determine whether the selected I/O device was available and then an SPO instruction word was programmed to initiate the requisite transfer operations. The several programming steps, in addition to demanding careful handling by the programmer required a substantial period of machine execution.

Accordingly, it is an object of the invention to provide improved apparatus for controlling data transfers between peripheral data handling devices and the central data processing apparatus.

Another object of the invention is to provide apparatus suitable for use in conjunction with digital computers and like devices employing a stored program of instructions which enables more expeditious programming techniques for controlling input-output data transfers.

Another object of the invention is to provide apparatus for use with digital computers and like devices in which only one instruction is required to select a data handling device, and to initiate and control data transfers between that device and the central processing apparatus.

Another object of the invention is to provide apparatus which enables relocation of control words for supervising data transfers by circuit logic in response to a single instruction.

Still another object of the invention is to provide apparatus which enables more flexible transfer of data between the central processing apparatus and peripheral data handling devices.

A further object of the invention is to provide means associated with a peripheral data handling device in which the operator may select a memory location and insert data in that memory location via that device in a continuous operation.

In the preferred embodiment of the invention there is provided circuit logic responsive to a single instruction which relocates one or more control words (dependent on the type of I/O operation selected) which specify and coordinate the entire required multiword data transfer. These control words are transferred from random memory locations to preassigned memory locations associated with the selected device and then control each data word transfer and are updated as required. The circuitry permits several different I/O devices to be operating and transferring blocks of data concurrently through time-shared data transfer circuitry and also enables computer operations also to proceed at high speed whenever the necessary circuitry for those operations is available. The system utilizes a plurality of memory units and references to several of these may be made simultaneously for several different operations. Circuitry, in response to the single instruction initially senses the I/O device specified by instruction to determine its availability. If it is not immediately available the instruction is placed in a hold condition and when the device becomes available, control is transferred to the Peripheral Control Element (PCE) which operates to relocate one or two control words (depending on the type of I/O operation) to fixed memory locations with reference to the selected I/O device by logic alone and then operates the I/O device in accordance with the control words so that the desired number of data transfer operations between the specified elements occur. In addition to the automatic relocation of control words, and transfer of data in accordance therewith, the system enables more flexible entry of data into the computer (CPE) either in a fixed mode in which a predetermined amount of data is stored in a memory area known to the computer program, or in a variable mode in which information may be stored in locations as desired by the operator. In prior art machines manual entry of data was specified by a wired address (control word) which would control the location of the entered data words. With the system of the invention in the fixed mode the programmer can select any control word he desires and repetitively transfer data from the associated device to the memory area specified by it until he desires to revise that control word. In the variable mode a control word can be entered by the operator directly through the device and data items entered in accordance therewith.

The foregoing and other objects, features and advantages of the invention will be apparent from the following more particular description of a preferred embodiment of the invention, as illustrated in the accompanying drawings, in which:

FIG. 2 is a diagrammatic layout of the format of the SLO instruction word which initiates I/O operations.

FIGS. 3a, 3b and 3c are diagrammatic layouts of the formats of three control words utilized for controlling I/O operations;

FIG. 4 is a diagram illustrating the several machine cycles used in selection and control word relocation cycles initiated by the SLO instruction;

Figures 5, 5A:
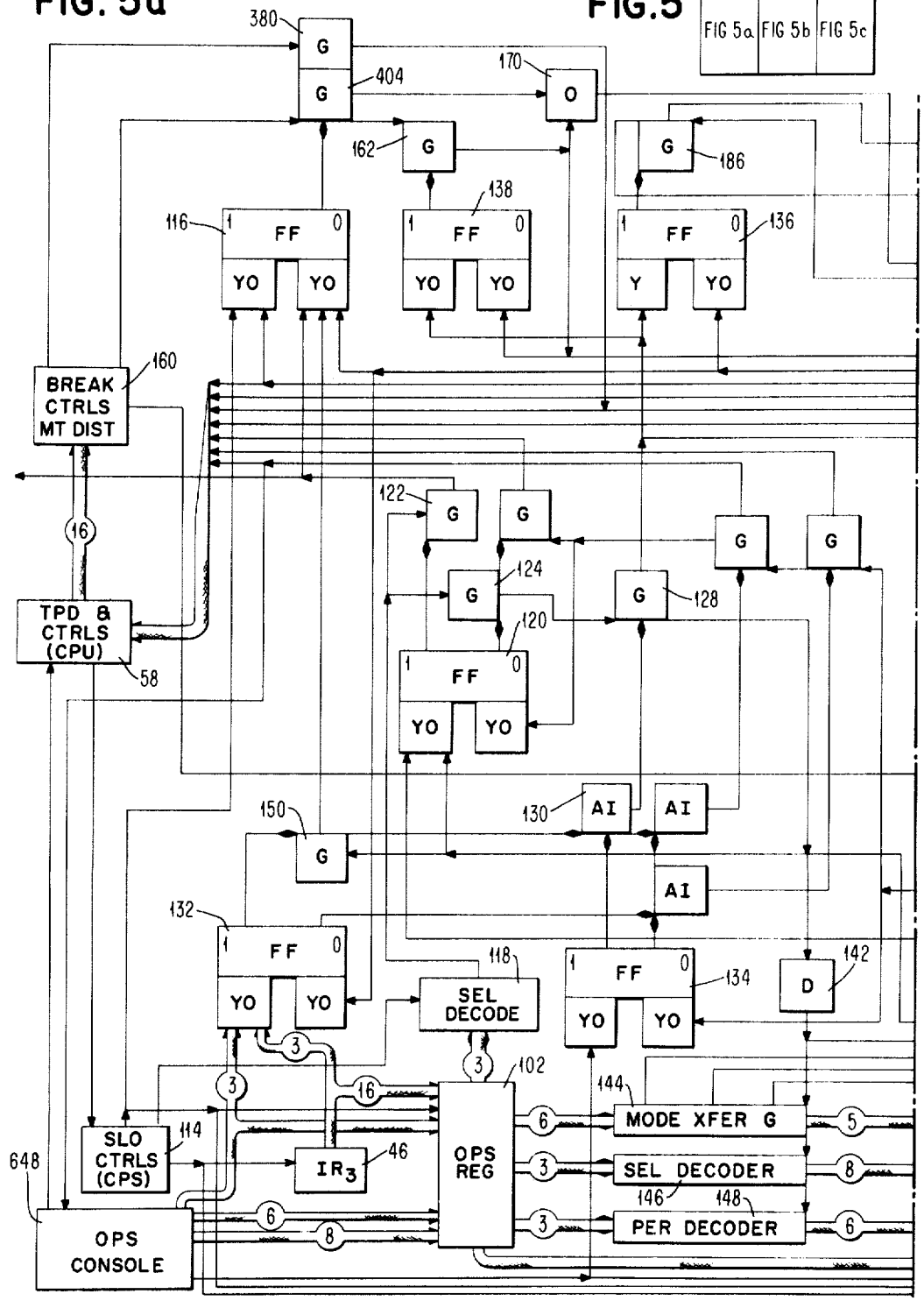
Figure 5C:
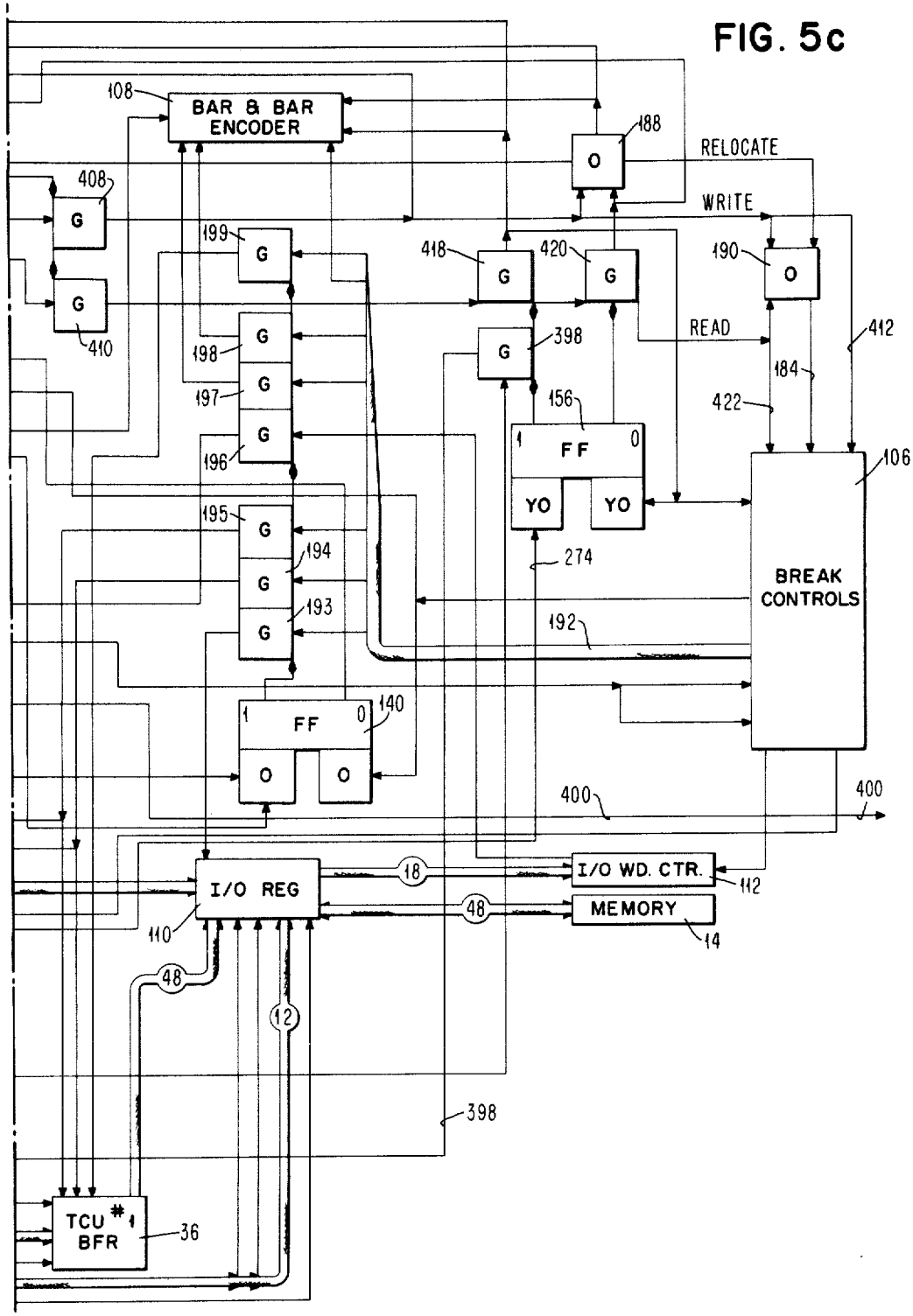
Figure 6B:
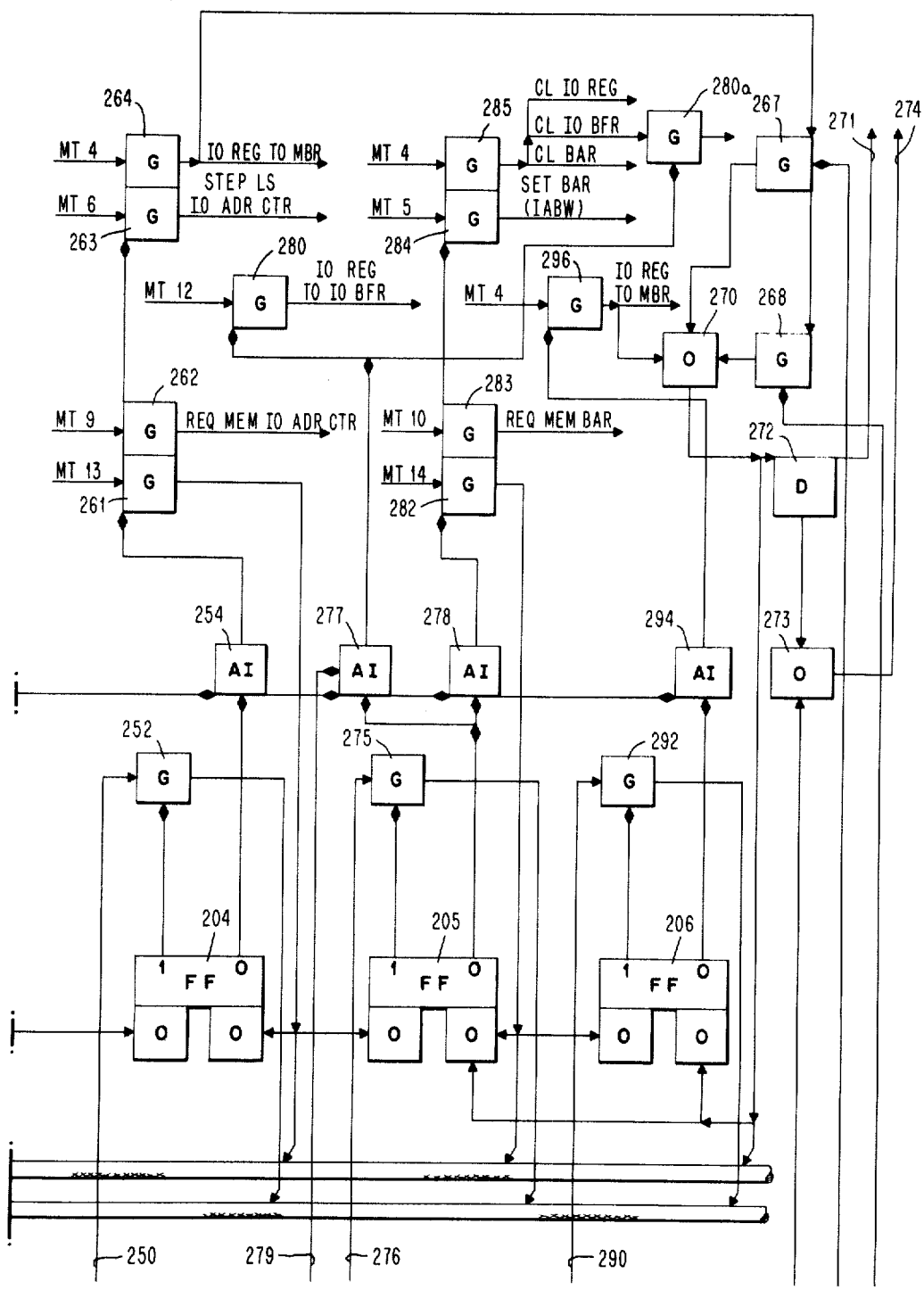
Figure 8C:
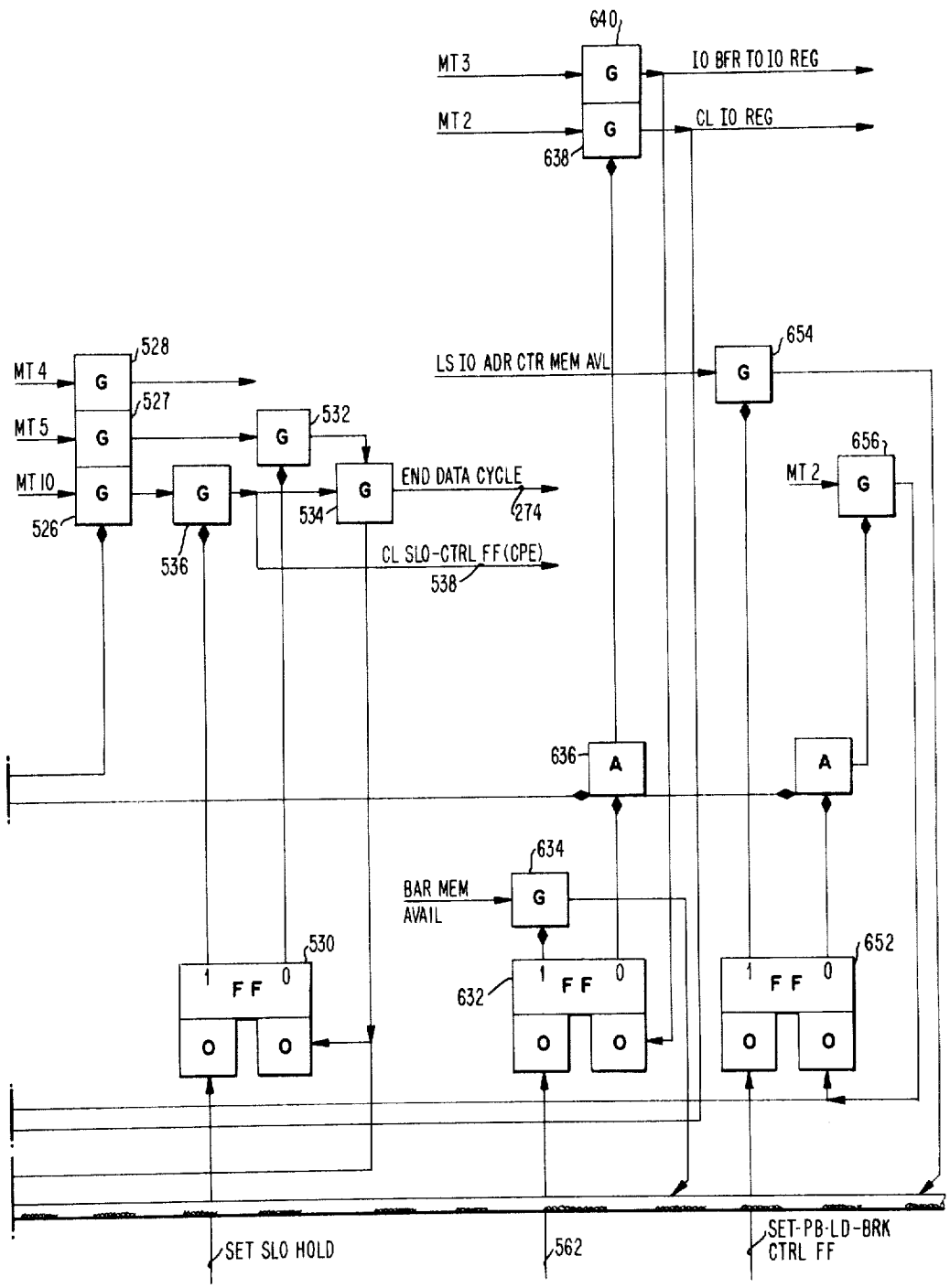
Figure 9:
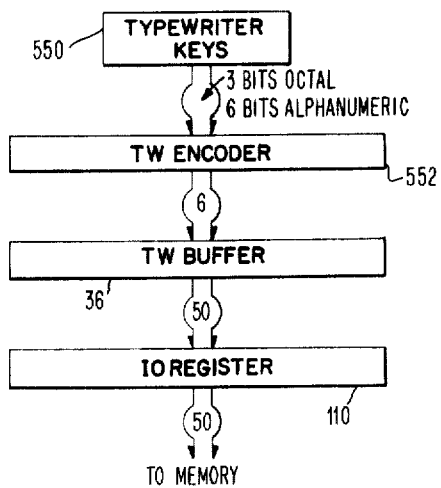
Figure 10:
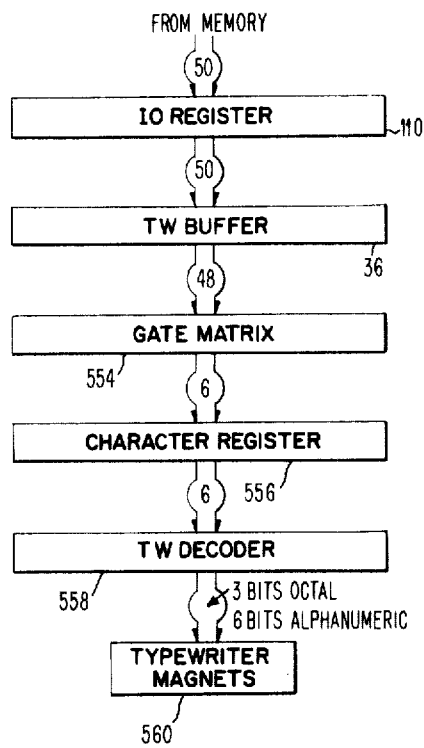
Figure 11C:
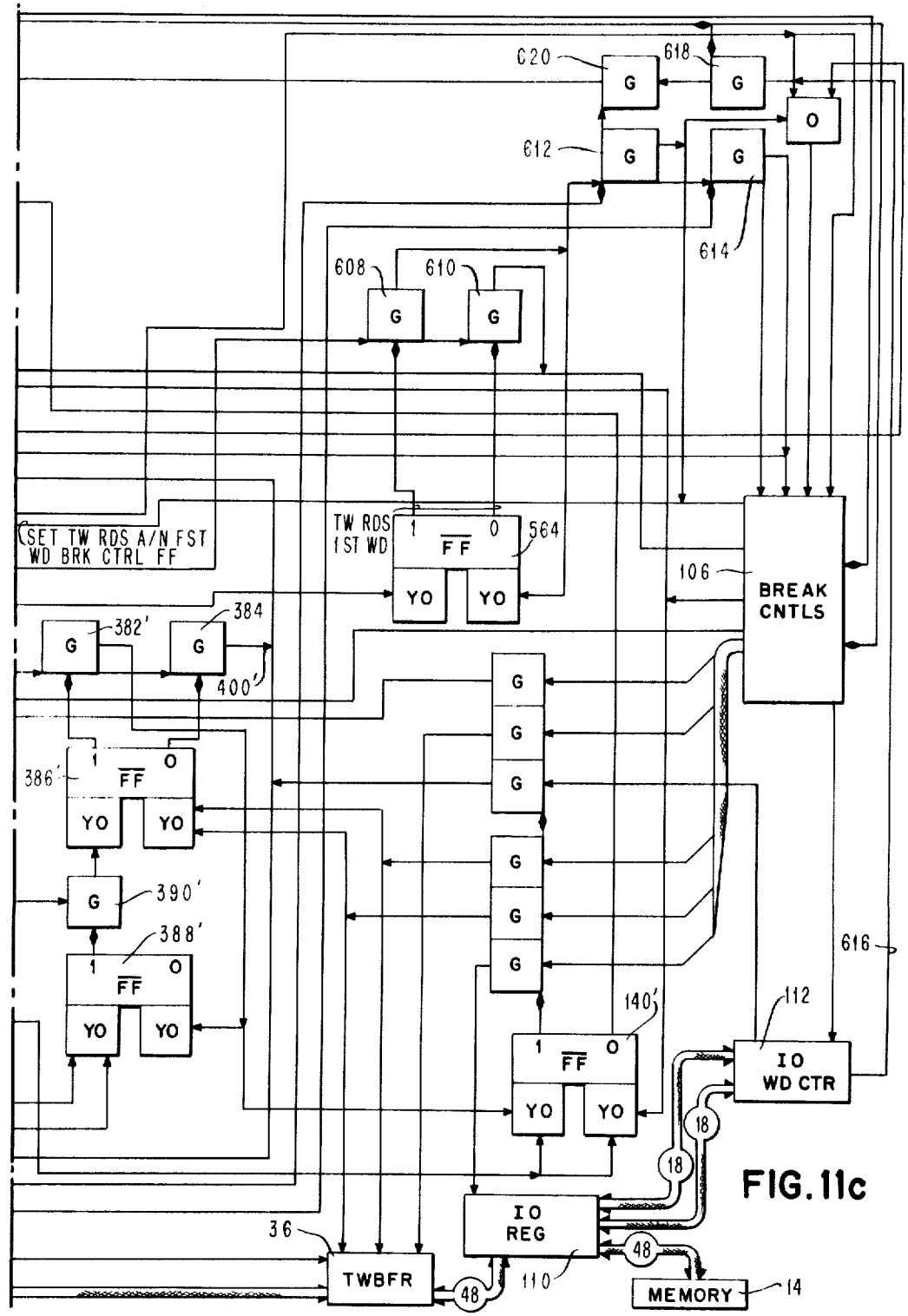

FIGS. 5a, 5b and 5c taken together show a logical block diagram of portions of the relocation and data transfer circuitry associated with the tape control unit No. 1 and are joined as shown in FIG. 5;

FIGS. 6a and 6b when joined according to FIG. 6 show a logical block diagram of the break control circuitry for a relocation cycle;

FIG. 7 is a logical block diagram of the Bookkeeping Address Register circuitry;

FIGS. 8a, 8b and 8c when joined according to FIG. 8 show a logical block diagram of the break control circuitry for data cycles;

FIGS. 9 and 10 indicate the data transfer paths to and from the I/O Typewriter, respectively;

FIGS. 11a, 11b and 11c when joined according to FIG. 11 show a logical block diagram of a portion of the relocation and data transfer circuitry utilized in an I/O typewriter operation; and FIGS. 12 and 12a illustrate certain portions of the I/O typewriter circuitry in diagrammatic form.

In the figures of the drawings a conventional arrowhead is employed on lines to indicate (1) a circuit connection, (2) energization with a pulse and (3) the direction of pulse travel. A diamond-shaped arrowhead indicates (1) a circuit connection, (2) energization with a D.C. level, and (3) the direction of application of that level. Boldface characters appearing within a block identify the common name of the circuit represented, that is, FF designates a flip-flop, G a gate circuit, OR a logical OR circuit, $\overline{A}$ a logical NOT AND circuit, P a parity check circuit, etc. A variety of circuits suitable for the performance of each of these functions is known in the art. However, specific examples of suitable components are disclosed in the co-pending application S.N. 824,119 filed in the name of Carrol A. Andrews et al. on June 30, 1959, and entitled Magnetic Core Transfer Matrix. The basic arrangement of computer logic is similar to that of the computer system disclosed in U.S. Patent No. 2,914,248, issued to H.D. Ross et al. on November 24, 1959.

Figure 1:
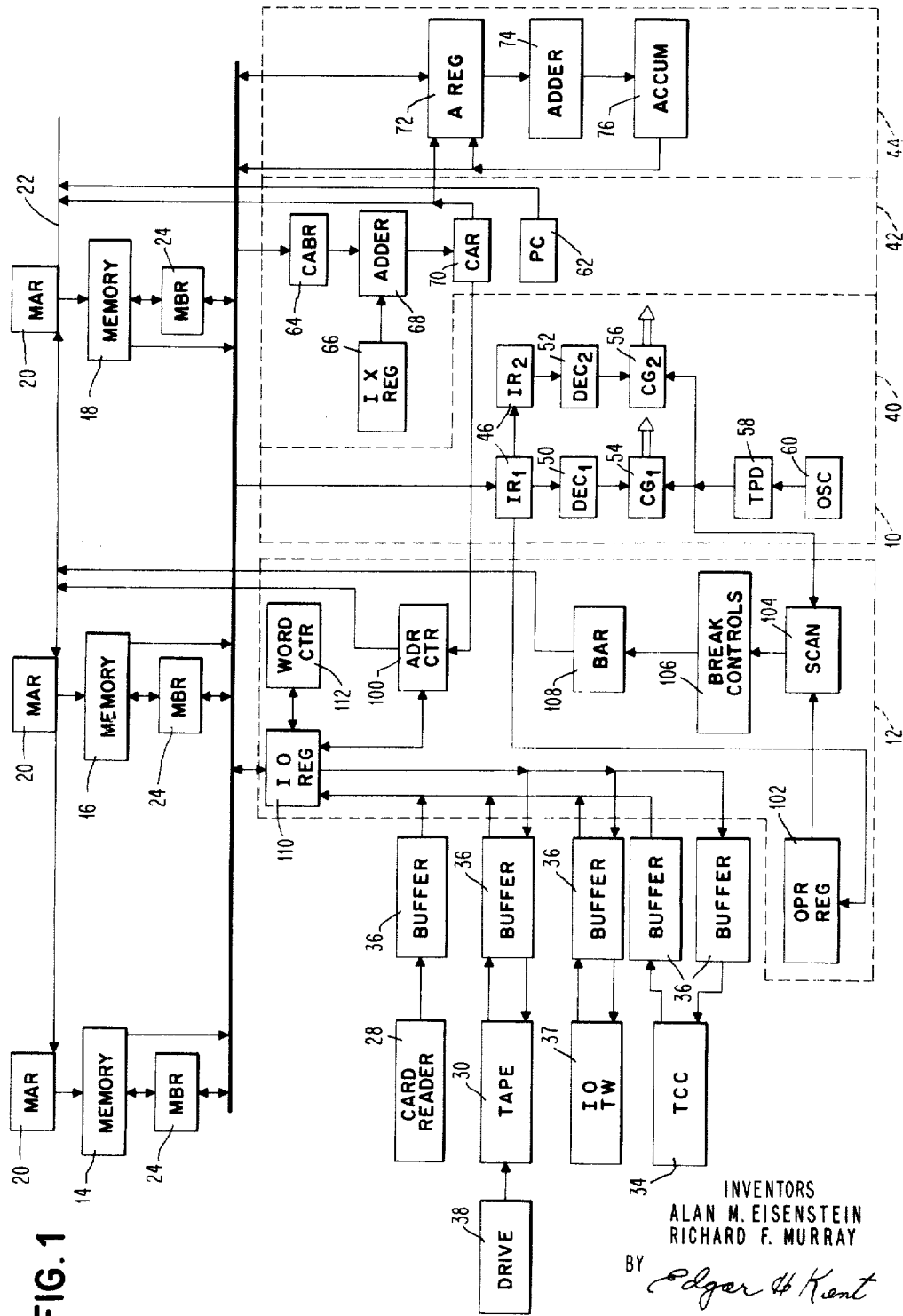
FIG. 1 is a block diagram of the apparatus of the preferred embodiment of the invention illustrating certain of the data transfer paths utilized therein.

The data processing system shown in FIG. 1 includes a computer 10 or Central Processing Element (CPE) 10, a Peripheral Control Element (PCE) 12, and a set of memories 14, 16, 18 that are utilized by both the CPE and PCE. These memories are addressed via associated Memory Address Registers (MAR) 20 and Memory Address Register Bus 22 and word transfers are made via associated Memory Buffer Registers 24 and/or Data Trasnfer Bus 26 between both the Central Processing Element 10 and the Peripheral Control Element 12. The Peripheral Control Element 12 controls the transfer of data between the memories 14, 16, 18 and I/O equipment such as a card reader 28, tape adapter units 30, I/O typewriter 32, and Traffic Control Center (TCC) 34. Other I/O devices such as printers, punches and similar data handling equipment are also incorporated in this system, although they are not shown in order to simplify the disclosure. Associated with each of the I/O devices is a buffer unit 36 which is adapted to hold a word of data for transfer to or from the associated I/O device. A drive unit 38 is associated with each tape adapted unit 30.

The Central Processing Element 10 includes an Instruction Control Element 40, a Program Control Element 42 and an Arithmetic Element 44. The Instruction Control Element includes first and second Instruction Registers 46, 48, and a decoder 50, 52 and a Command Generator 54, 56 is associated with each. A Time Pulse Distributor (TPD) 58 supplied with pulses from Oscillator 60 applies timing pulses to the command generators and to other portions of the Central Processing Element and the Peripheral Control Element for performing the necessary control functions, the execution of instructions and processing of data. The machine cycle is 2.496 microseconds in length and sixteen time pulses (MT0–15) of 0.030 microsecond duration each are generated at intervals of 0.156 microsecond during such cycle.

In the Program Control Element there is a Program Counter 62 which normally specifies the address of the next instruction in one of the memories. The Operate portion of this Instruction is read into the Instruction Register 46 and the Address portion of the instruction is read into a Buffer Register (CABR) 64 where it may be combined with the contents of one or more Index Registers 66 by means of adder 60 (single or double indexing and loaded into the Central Address Register 70. This modified address portion may be utilized as real data for processing in the Arithmetic Element; to specify the address of data required for the processing of the instruction; or it may be transferred to the Peripheral Control Element 12 to specify the address of the control word for initiating the I/O operation.

The Arithmetic Element 44 contains arithmetic and logical manipulation circuitry for data processing and is indicated as including an A Register 72 which may be loaded from the Memory Bus 26 or from the Central Address Regster, an Adder 74 and an Accumulator 76. Additional details of suitable circuitry arrangements for performance of these general functions may be had with reference to the co-pending applications, S.N. 823,988 entitled Data Processing Machine filed in the name of John D. Newton on June 30, 1960, S.N. 39,879 entitled Program Control Element filed in the name of Ralph W. Pulver, Jr., on June 30, 1960, and S.N. 79,928 entitled Data Manipulation Apparatus filed in the name of James W. Delmege, Jr. et al. on Dec. 30, 1960 if desired.

The Peripheral Control Element includes an I/O Address Register 100, the contents of which, as normally utilized, specify the memory address with which a data transfer is to be effected; an Operation Register 102, the contents of which identifies the I/O device to be utilized in accordance with information in the operation portion of the SLO instruction; Scan circuitry 104 when enables the servicing of each of the I/O devices in turn; Break Control Circuitry 106; a Bookkeeping Address Register 108; an I/O Register 110 which provides a common path for transfers of data between memories and the I/O devices; and an I/O Word Counter 112.

Selection of an I/O device in general is accomplished by using the SLO instruction. Limited operation of the tape drives 38 can be initiated by push button controls at the operator's control, and the I/O typewriter 32, when used as an input device, is under manual control. Transfers between several I/O devices and the memory elements of the data processing system may be occurring concurrently, and in addition the program of the computer may be also being performed. This is possible because of the relatively slow operating speeds of the I/O devices compared with the speed of the Central Processing Element and because of the multiple memory reference arrangement. All transfers between the I/O devices and the memory are through the I/O register 110 which thus is time-shared. In addition the control words which are relocated by the SLO instruction are also transferred through the I/O register. The use of this and other time-shared circuits by the several I/O devices is supervised by the Scan element 104.

The format of the SLO instruction word is shown in FIG. 2. As shown in that figure the instruction is composed of forty-eight data bits and two parity bits (Data words are of similar forty-eight bit composition). Bits S–6 of the SLO instruction identify the instruction; bit 7 is unused; bits 8–10 are an operate code used for control of tape operations; bits 11–17 are mode control bits which specify read, write, typewriter mode operations, etc.; bits 18–23 are selection bits which specify the I/O device; bits 24–29 are used in indexing; and bits 30–47 specify the base address of the first control word to be employed during this instruction.

When the SLO instruction is first decoded in the Instruction Register 46 and decoder 50, a signal sent from the Scan Element 104 is sampled to determine whether an I/O data transfer is in progress (Scan Active) and if one is in progress the instruction is placed in a hold by inhibiting further generation of commands for that instruction so that it remains in Instruction Register 46 until the Peripheral Control Element is available. At that time the operation portion of the instruction is transferred from Instruction Register 46 to Operation Register 102 and the address portion of the instruction (which may have been modified in an indexing operation) is transferred from the Central Address Register 70 to the I/O Address Counter 100.

The formats of three control words which may be utilized in I/O transfers are shown in FIG. 3. The first control word (FIG. 3a) has bits 6–23 which specify the I/O word count (the number of words that are to be transferred during the I/O operation of the selected device) and bits 30–47 which define the starting address in memory that is to be utilized for the data transfer. The second control word (required only in binary tape operations) is shown in FIG. 3b. Bits S–23 are identify bits and bits 40–47 are tape identity address bits. The Control Bookkeeping Word (CBW) (a reconstituted instruction utilized for error detection) is shown in FIG. 3c. This is a composite of the first control word and certain of the bits in the operation portion of the SLO instruction. Bits S–2 are the select bits (21–23) of the instruction; bits 3–5 are the operate bits (8–10) of the instruction; and bits 24–29 are the mode bits (11–16) of the instruction.

An indication of the machine cycles required for decoding and relocating the control words is shown in FIG. 4. As shown in that figure, a first memory cycle is required to obtain and decode the SLO instruction. If the PCE is available the operation portion and address portion are transferred and decoded in the next machine cycle. A second memory cycle is used to obtain the first control word, a third memory cycle to store that control word as a bookkeeping word (BW), and a fourth memory cycle is used to store a reconstituted control bookkeeping word (CBW). In tape operations in the binary mode, a second control word is obtained from memory in the fifth memory cycle and that control word, an Identity Address Bookkeeping Word (IABW), is stored during the sixth memory cycle. (The IABW is compared with information associated with each word on the tape and when a comparison is made data transfers are initiated.)

With more particular reference to the components of the Peripheral Control Eleemnt 12, the I/O register 110 is a fifty-bit flip-flop register which provides buffering for word transfers between any I/O device and any Memory Buffer Register. It is also connected to the I/O Address Counter 100 and to the I/O Word Counter 112. Transfers between the I/O Register 110 and the I/O Word counter 112 are done in complement form (except for manual entry of I/O typewriter). The I/O Address Counter 100 provides temporary storage of the referenced memory address during transfer of information between a memory and an I/O device and consists of eighteen bit stages plus a parity bit stage. The contents of the I/O Address Counter are updated (increased by one) each time a word is transferred so that the data transfers in accordance with a single instruction are made to or from sequential memory addresses. The I/O Address Counter is also time-shared during data transfer operations and the control words are stored in the assigned bookkeeping memory addresses during the intervals of non-use by the associated I/O device so that need for a separate Address Counter for each device is avoided. The I/O Word Counter 112 provides temporary storage of the word count during transfer of data between memory and the I/O devices and, like the Address Counter, includes eighteen data bit stages plus a parity bit stage. The contents of the Word Counter are modified by stepping the counter once during each data transfer and the modified count is restored to its bookkeeping address prior to the next word transfer (in a single control word with the address count from the I/O Address Counter). The I/O operation is terminated when the I/O Word Counter contains negative zero which indicates that the desired number of data words as specified by the control word have been transferred. (An exception to this is during an I/O typewriter input operation in which the word count is increased by one from positive zero each time a word is transferred from the typewriter. At the end of the I/O operation in this case the word counter indicates the number of words that have been transferred.)

The Operation Register 102 is divided into three logical sections: an Operate Mode Decoder; a Selection Decoder; and Selection Control. When the bits 8–23 of the SLO instruction word are transferred from Instruction Register 46, bits 8–16 are transferred to the Operate Mode Decoder and bits 18–23 are transferred to the Selection Decoder (bit 17 not being used). The Selection Control logic contains interlocks for each I/O device. When the selection bits are decoded a select pulse is generated and transferred to the Selection Control circuitry which samples the interlock of the selected device in that circuitry. If the device is available (not presently being used) the select pulse sets the interlock indicating that the device is being used and that interlock will remain set until the particular I/O device is through with its prescribed data transfer (when the word counter goes to zero during a data transfer with that device) at which time the interlock will be cleared.

The Scan circuitry 104 indicates the status of the buffer registers 36 associated with each I/O device. Those buffer registers are each fifty bit flip-flop registers which accommodate the high speed of the computer to the relatively slow speed of the associated I/O device and temporarily store word transfers to and from the associated devices. (It will be noted that the Traffic Control Center channel 34 has two buffer registers, one for read operations and the other for write operations which enable messages to and from TCC to be handled more expeditiously.) A Scan channel is associated with each I/O device and these channels are sensed in a sequential manner to determine the highest priority device that requires servicing (an I/O device requires servicing when it is ready to transmit or receive information). The I/O device with the highest word transfer rate has the highest Scan priority and the channels are strobed in a serial manner according to this priority. Servicing is requested either when the buffer register 36 associated with the channel is full and a read function is selected, or when the register is empty and a write function is selected. When a channel that requires servicing is detected further scanning is inhibited and the Scan pulse is gated and applied to the Break Control circuitry 106 to set up the circuits necessary for the transfer of data between the specified memory and the selected I/O device. After the data transfer is completed and the scanning is resumed with a scan pulse occurring once each machine cycle.

The Break Control circuitry applies the gated Scan pulse to the Bookkeeping Address Register (BAR) 108 to set up in that register an address associated with the I/O device that is to be serviced. This Bookkeeping Address Register is shown in FIG. 7 and includes a five bit register (flip-flops 301–305) which is used to define any of thirty-two storage addresses used for storing bookkeeping words plus a parity bit stage 300. Although fourteen bits are normally required to specify a memory location, the last thirty-two locations of a one memory are utilized for storing bookkeeping words and therefore only five bits are required to select those locations (the higher order Memory Address bits (bits 34–42) all being set to ones automatically by the BAR). The register is cleared by a pulse on line 308. Information from the BAR encoder is applied as a single pulse to a selected number of the flip-flops to provide the desired Bookkeeping word address indication. For example, the bookkeeping word address for a Traffic Control Center Read operation is set in the flip-flops by a pulse on line 310 and for a TCC Write operation by a pulse on line 312. In like manner the TCC Control Bookkeeping Word address for a Read operation is set by a pulse on line 314 and the TCC CBW address for a Write operation is set by a pulse on line 136. A pulse on line 318 transfers the contents of the Bookkeeping Address Register to the I/O Address Counter 100 via gates 320–325 (for the Fix program) and a pulse on line 328 transfers the data bits of the contents of the Bookkeeping Address Register to the Memory Address Register 20 associated with the memory in which the bookkeeping words are stored via gates 331–335. At the same time the pulse is passed through a pulse amplifier 336 and is applied as a Start Memory pulse on line 338. In this way the contents of the address assigned to the selected I/O device are read out to control the data transfer. Parity of the contents of the Bookkeeping Address Register is transferred by a pulse on line 340 which samples gate 342. Parity circuits 344, 346 and 348 are associated with the Register and a parity check may be initiated by a pulse on line 350 which is passed through OR circuit 352. The parity of the Bookkeeping Address Register may be tested by a pulse on line 354 which is applied to the complement input of the parity flip-flop 300, then via delay unit 356 and OR circuit 352 to the parity chain.

*Tape adapter unit control*

A portion of the PCE logic is shown in FIG. 5. This portion of the logic includes the control circuitry particularly associated with the Tape Adapter Unit, which in many respects is illustrative of the control operations enabled by the apparatus of the invention.

In initiating the SLO instruction, after that instruction has been transferred to Instruction Register 46 and to the Central Address Buffer Register 64, the operation portion of the instruction is initially decoded by Decoder 50 and the Peripheral Control Element is checked to see whether a hold is required. If the PCE 12 is active a SLO control flip-flop associated with the decoder 50 is cleared, removing a conditioning level from the transfer path to the command generator 54 and thus inhibiting generation of commands so that further execution of the instruction is stopped. When the PCE becomes inactive the SLO control flip-flop and a SLO transfer flip-flop are set, thereby allowing transfer of cycle control (CY) pulses from the TPD 58 which initiate the transfer of the SLO instruction.

At ZERO time of the next machine cycle after availability of the PCE has been established, a CY0 pulse is gated by the SLO control circuitry 114 and clears the Operation Register 102, the Address Counter 100 and the Bookkeeping Address Register 108; sets a SLO activity synchronizing flip-flop in the Instruction Control element; and sets the Scan Status flip-flop 116 in the Peripheral Control Element to inhibit further scanning. At CY 2 time of this cycle the contents of the Instruction Register 46 (bits 8–23) are transferred to the Operation Register 102 and the contents of the Central Address Register 70 are transferred to the Address Counter 100. At CY 4 time the SLO transfer and SLO control flip-flops (CPE) are cleared and the SLO start pulse is transferred from the Instruction Control element to the Peripheral Control Element. The clearing of the SLO control flip-flop indicates that the Peripheral Control Element is active so that further machine cycles involving instructions which would utilize this element are inhibited until the PCE again becomes available.

The SLO start pulse, transferred at CY 4 time, samples the Selection Decoder Register 118 and generates a select pulse for the specified device. This pulse checks the interlock flip-flop 120 of the selected device (in the logic shown in FIG. 5 this is the tape adapter No. 1 only the logic utilized with that device being shown in this figure). If the interlock is set, the pulse is passed by gate 122 as a busy pulse and the Scan state flip-flop 116 is cleared. (Should the interlock of the selected device be set, the instruction is lost unless it is recovered by the interrupt section. However, this condition can easily be avoided by proper prgramming techniques.) If the interlock is clear, the pulse is passed by gate 124 as a preselect pulse to examine the availability of the selected device 126 and also to set the interlock flap-flop 120 indicating that the device is in use. The pulse also samples gate 128 which is conditioned by NOT AND circuit 130. That circuit has a conditioning output when neither the OPERATE flip-flop 132 or the Push Button Load flip-flop 134 is set. Under that condition the pulse is passed to set the Relocate flip-flop 136, the Select Control flip-flop 138 and the Scan Channel flip-flop 140 associated with the selected device. (When any I/O device other than tapes is not available ("off the line," for example) the interlock flip-flop is cleared by a Not Available pulse which also clears the Scan Channel and Scan Status flip-flops. The Scan Channel flip-flop is cleared to prevent data transfers to this device and the Scan Status flip-flop is cleared to enable the continued buffer searching operation to determine whether any servicing is required. The tape adapter interlock operation differs in that the interlock is set anticipating the availability of the device. This is desirable as the tape adapter requires sixteen microseconds to determine the availability of the tape drive, and with this anticipation operation, more efficient utilization of the available machine time is achieved.)

The pre-select pulse is also applied to a 250 millimicrosecond delay unit 142 and then is passed as a select pulse to the unit 126 and also gates the mode bits through gates 144 and tape drive and operation information from decoders 146 and 148 to the unit. In addition, mode bits are transferred to set either the Write flip-flop 152 or the Read flip-flop 154, and also to set the Store Identity flip-flop 156 if identity mode operation is specified. A further check is also made on the status of the Operate flip-flop 132 by sampling gate 150. If that flip-flop is set, the pre-select pulse is passed to clear the Scan Status flip-flop 116 to permit another Scan. The specific flip-flops associated with the selected I/O device, such as the Interlock flip-flop 120 and the Write flip-flop 152 or Read flip-flop 154, remain set until the completion of the data transfer specified by the bookkeeping word.

Once the selection cycle is completed, the relocation cycle commences. This cycle obtains the control word(s) for the data transfer from the memory location specified by the address portion of the SLO instruction and places it in the address(es) assigned to the selected I/O device. (A relocation cycle is not executed when the operate mode is decoded in a tape select SLO instruction as control words are not necessary in that mode. In other words, an operate mode and a read or write mode cannot be selected at the same time.) As indicated above, the Scan Channel, Selection Control and Relocate flip-flops 116, 138, and 136 respectively, have been set before the relocation cycle is instituted. With the Select Control flip-flop 138 set an MT 9 pulse from the TPD 58 via a Break Control Pulse Distributor 160 is passed by gate 162: as a Memory Request pulse through the decoder 164 associated with the Address Counter 100; to set an I/O register control flip-flop (line 168); to set an I/O address counter memory request flip-flop (line 170) which allows a memory available pulse to set the activity flip-flop in the Central Processing Element 10; and to clear the Select Control flip-flop 138.

The gated MT 9 pulse, passed through the OR circuit 170, samples the gates 172 and 174 that are conditioned by NOT AND circuits 176 and 178 respectively. These NOT AND circuits have conditioning levels from the Write flip-flop 152 or the Read flip-flop 154 respectively, together with a conditioning level from the set Scan flip-flop 140. One of these gates is conditioned and will pass the pulse through OR circuit 180 as a Scan Active pulse to the Central Processing Element control circuitry 58 and also to the ONE side of the Scan Status flip-flop 122 (turning the Scan off). The pulse also is passed through OR circuit 182 to sample the Push Button load flip-flop 184 and the Relocate flip-flop 136. As that latter flip-flop is set, the pulse is passed through gate 186 to OR circuit 188 to set the BAR 108 to the bookkeeping word address associated with the selected tape unit and through OR circuit 190, to set the Break Cycle 1 flip-flop (see FIG. 6) in the Break Control circuit 106. This operation initiates the series of three or five Break Cycles required for control word relocation. Pulses are generated over cable 192 from the Break Control 106 and applied to gates 193–199 which are conditioned by the ONE output from the set Scan flip-flop 140 to perform various of the operations.

The relevant portions of the Break Control circuitry for the relocation cycle and for the data cycle are shown in FIGS. 6 and 8, respectively. It will be noted that certain of the elements shown in these figures are used in both cycles but in order to more clearly illustrate the logical functions that are performed during each cycle, the circuitry has been shown in two separate figures. For example, both cycles use common Break Cycle flip-flops 201 and 202; the Relocation Control utilizes Break Cycle flip-flops 204, 205 and 206; and Break Cycle flip-flop 203 is utilized only in the data cycle control.

In the relocation cycle operation, flop-flop 201 is set by the gated MT 9 pulse (line 184) and conditions gate 210. An MT 15 Memory Available pulse on line 212 samples that gate and is passed to set the Relocate Cycle Break Control flip-flop 214. (Memory Available signals are required as apparatus having a higher priority may request the same memory during that cycle and under that condition the Memory Request is not honored until that memory is not being used by higher priority devices). This memory is specified from the I/O Address Counter 100 which contains the bits transferred from CAR 70. When both the Relocate Cycle Break Control flip-flop 214 and Break Cycle flip-flop 201 are set, the NOT AND circuit 216 has an output which conditions gates 220–226. The gate 224 is strobed by an MT 3 pulse which is passed to clear the I/O register 110. After the MT 3 pulse and before the MT 9 time, the first control word is transferred from the specified memory address to the I/O Register 110. An MT 9 pulse is passed by gate 221 as a BAR Memory Request pulse which requests the memory address selected by the Bookkeeping Address Register 108. At MT 11 time a pulse is passed through gate 222 to clear the I/O Word Counter 112 and at MT 12 time a pulse is passed by gate 226 to transfer a portion of the I/O Register contents to the I/O Word Counter. The contents of the Word Counter are checked for ZERO at MT 13 time by a pulse passed by gate 220, and if the counter contains ZERO, a disconnect is immediately requested (indicating that no words are to be transferred). In addition, the MT 13 pulse clears the Break Cycle flip-flop 201 and Relocate Cycle Control flip-flop 214 and sets the Break Cycle flip-flop 202. Thus, during the first machine cycle the control word specified by the SLO instruction has been transferred from a Memory and its word count portion checked.

Error checking circuitry associated with each Break Cycle flip-flop is identical. The error checking circuitry associated with flip-flop 201 which is typical is shown in dashed lines. The circuitry includes an Error Check flip-flop 228 which is initially set by the gated MT 15 Memory Available pulse and then each pulse passed by the conditioned gates 220–225 complements the flip-flop. The next MT 15 pulse samples gate 226 conditioned by the flip-flop and if it is in the wrong state, the pulse is passed to generate an alarm.

The first control word is stored in the proper Bookkeeping Word Address during the second break cycle. This break cycle is initiated by an MT 15 Memory Available pulse on line 230 which is generated if the memory specified by the Bookkeeping Address Register is available. That pulse strobes gate 232 conditioned by flip-flop 202 and is passed to set flip-flop 214. As a result, the NOT AND circuit 234 has an output which conditions the gates 241–245. The next MT 3 pulse samples gate 244 and is passed to clear the Bookkeeping Address Register. At MT 4 time a pulse is passed by gate 245 to gate the contents of the I/O Register 110 to the addressed Memory Buffer Register 24 and the Bookkeeping Address Register 108 is set to the address for the Control Bookkeeping Word. An MT 7 pulse, passed by gate 246, transfers the contents of the Operation Register 102 (PER, mode and select bits) to the I/O Register 110 to form the Control Bookkeeping Word. (The Control Bookkeeping Word is stored in a fixed memory location and is extracted whenever an alarm disconnect is generated to assist in program reconstruction. In this way the pertinent portions of each original SLO instruction and the Bookkeeping Word specified by it are retained for FIX program purposes.) At MT 9 time a pulse is passed by gate 242 to request the memory specified by the Bookkeeping Address Register so that the contents of the I/O Register 110 may be stored in the Control Bookkeeping Word address during the third cycle. The MT 13 pulse is passed by gate 241 to set the Break Cycle flip-flop 204 and to clear the Break Cycle flip-flop 202 and the Relocate Cycle Control flip-flop 214.

The Control Bookkeeping Word is stored during the third break cycle and that operation is initiated by the BAR Memory Available pulse at MT 15 time on line 250 which strobes gate 252 and is passed to set flip-flop 214. The resultant output levels from flip-flops 204 and 214 enable the NOT AND circuit 254 to provide a conditioning level to gates 261–264. The control Bookkeeping Word is transferred from the I/O Register 110 to the Selected Memory Buffer Register 24 at MT 4 time by a pulse passed by gate 264.

The relocation cycle is terminated during this cycle unless tape operation in the binary mode is specified. Thus the gated MT 4 pulse also samples gates 267 and 268 which are conditioned by tape not selected and BCH mode levels respectively. If the pulse is passed by either gate it is applied via OR circuit 270 to clear flip-flops 205, 206 and 214. A false word demand is generated for any device (other than tapes) in the Write mode over line 271 which samples the Scan channel flip-flops and sets the buffer status sync flip-flop (described in conjunction with data cycles) to allow the first word to be transferred to the associated buffer register 36. This transfer is from the memory address specified by the I/O Address Counter and it will be discussed in greater detail in connection with the FIG. 8 which shows the data cycle break control logic. The pulse, after being delayed by circuit 272 is passed through OR circuit 273 as an End Relocate Cycle pulse on line 274.

However, if it is established that a tape binary operation has been specified the Address Counter 100 is stepped by an MT 6 pulse passed by gate 263 and at MT 9 time a pulse is passed by gate 262 as a Memory Request pulse. The MT 13 pulse passed through gate 261 sets flip-flop 205 and clears flip-flops 204 and 214.

The second control word (IABW) is read from memory during the fourth break cycle under the control of flip-flop 205. This cycle also checks for status or identity mode of tape operation. The break cycle flip-flop 205 conditions gate 275 to pass the MT 15 Memory Available pulse applied on line 276 to set flip-flop 214. The resultant output levels enable NOT AND circuits 277 and 278 to provide gate conditioning levels. If identity mode is specified, no level is applied on line 279 and gate 280 is conditioned by the level from NOT AND circuit 277. At MT 4 time a pulse is passed by gate 285 to clear the I/O Register 110, the I/O buffer 36 (if identity mode) and the Bookkeeping Address Register 108. An MT 5 pulse samples gate 284 to set the Bookkeeping Address Register to specify the bookkeeping address for the Identity Address Bookkeeping Word (IABW). At MT 10 time gate 283 passes a Memory Request pulse. As mentioned previously, when in the identify mode, gate 280 is also conditioned. At MT 12 time the contents of the I/O Register 110 (the IABW which is used for addressing tape records) are transferred to the tape buffer 36 by a pulse passed by gate 280 to be stored for comparison with identify information recorded on the tape if a Read or written on the tape if a Write. The MT 14 pulse is passed by gate 282 to clear flip-flops 205 and 214 and to set the flip-flop 206.

The MT 15 pulse on line 290 is gated when the memory specified by the BAR is available, and is passed by gate 292 to set the Relocate Cycle Control flip-flop 214 which provides an output level to condition the second input of the NOT AND circuit 294, thereby conditioning gate 296. An MT 4 pulse is passed by this conditioned gate to store the IABW in the address specified b ythe BAR. This pulse is also passed through OR circuit 278 to clear the Relocate Cycle Control flip-flop 214 and to terminate the relocation cycle via delay unit 272 and OR circuit 273.

With reference one again to the logic diagram of FIG. 5, as mentioned above, the first control word is extracted from a memory and transferred to the I/O Register 110 during the first break cycle. The word control portion is then transferred from the I/O Register 110 to the word Counter 112. If the word counter contains ZERO, a check pulse at MT 13 time is passed by gate 196 of the selected unit 30 to clear the Write or Read flip-flop 152, 154 respectively and to request a disconnect which, inter alia, clears the interlock flip-flop 120 and indicates to the CPE that the SLO operation is complete. Otherwise, the first control word is stored into its Bookkeeping Word Address as specified by the Bookkeeping Address Register 108. A BAR memory request is generated by a pulse passed through OR circuit 360 at MT 9 time to the Memory Select Decoder 362. Availability of the selected memory is checked (as two data handling devices, the Program Counter 62 and the CAR 70 may simultaneously request a memory) and when the memory is available, the control word is stored in its Bookkeeping Word Address and the Control Bookkeeping Word is assembled during the second break cycle. This cycle is initiated by an MT 15 memory available pulse. An MT 3 pulse clears the BAR (line 364) and at MT 4 time a pulse is passed by gate 198 to set the BAR 108 to the address of the Control Bookkeeping Word (CBW). At the same time the Bookkeeping Word stored in the I/O Register 110 is gated to the specified Memory Buffer Register 24. Instruction bits from Operation Register 102 are then transferred to the I/O Register 110 to complete the Control Bookkeeping Word. At MT 9 time a Memory Request is generated from the BAR and when the selected memory is available, the Control Bookkeep Word is stored during the third break cycle. The Control Bookkeeping Word is transferred from the I/O Register 110 to the selected Memory Buffer 24 at MT 4 time and the relocation cycle terminates at this time if a binary tape operation is not specified. The termination pulse (line 274) clears the Scan flip-flop 140, the Relocate flip-flop 136, the Scan Status flip-flop 116 and the Operate flip-flop 132.

However, if a tape binary operation is specified by the instruction an Identity Address Bookkeeping word (IABW) is required. The relocate cycle is not terminated but rather the Address Counter 100 is stepped by an MT 6 pulse. A memory is referenced and the second control word is extracted during the fourth break cycle, in which an additional check for the identity mode of tape operation is also performed. This mode is indicated by the Store Identity flip-flop 156. At MT 4 time the BAR is cleared. At MT 5 time a pulse is passed by gate 197 and sets the BAR 108 to the bookkeeping address of the IABW, and the memory is requested. During the fifth and last machine cycle of the relocation which is initiated when the memory is available, the IABW is stored at MT 4 time in the address specified by the BAR. The relocation cycle is then terminated and the End Cycle pulse on line 274 clears the Scan Channel, Relocate and Scan Status and the Operate flip-flops.

The I/O Register is then free so that the PCE may execute data cycle operations in accordance with the Scan Channel indications.

The transfer of one data word (forty-eight data bits plus two parity bits), to or from a memory (14, 16, 18), is accomplished during a data cycle. The number of data cycles to be executed is determined by the number in the word count portion of the bookkeeping word while the address portion of the bookkeeping word indicates the location in memory that data is to be extracted from or stored into. The previously described relocation cycle, in addition to setting up the mode of operation of the selected device, transfers the bookkeeping word or words from a random location in the memory elements to a specific memory location assigned to the selected I/O device. Each data cycle utilizes three break (machine) cycles (with the exception of a tape store identity operation in which only two break cycles are to be used). In break cycle 1 the Bookkeeping Word is extracted from its memory address and transferred to the I/O Word and Address Counters; in break cycle 2 the data word is transferred between the buffer 36 of the selected device and the specified memory and the Bookkeeping Word is updated by adding ONE to each quantity stored in the Word and Address counters; and in break cycle 3 the updated Bookkeeping Word is returned to its assigned location in memory. Several SLO data transfers may be in process at the same time, although only one transfer at a time can utilize the time-shared I/O Register 110. The arrangement permits economies in equipment while enabling data to be transferred at substantially the maximum possible rate.

The data cycle is initiated when an I/O buffer 36 requires servicing. The Buffer Status flip-flops are sampled serially in the order of their priority when the circuitry is not being used for relocation or data transfer by an MT 6 pulse which is passed through gate 380 that is conditioned by a level from the cleared Scan Status flip-flop 116. This MT 6 pulse clears the Bookkeeping Address Register 108, signals the Central Processing Element that a scan operation is being performed and serially senses the gates 382, 384 that are associated with the Buffer Status flip-flops 386. Associated with each Buffer Status flip-flop is a Buffer Status Sync flip-flop 388 and a gate 390 which is conditioned by the Sync flip-flop when it is set. The Sync flip-flop is set by a Word Demand pulse on line 392 or a Word Available pulse on line 394, both generated by the associated I/O device; and also, in the case of the tape unit logic shown in FIG. 5, by a first word pulse from the tape control unit 30 which samples gate 396 and is passed on line 398 if the Store Identity flip-flop 156 is set to set the Sync flip-flop. An MT 5 pulse from the Break Control Distributor 160 samples gate 390 and whenever the Sync flip-flop 388 is set, the pulse is passed to set the associated Buffer Status flip-flop 386. The MT 6 pulse then samples gates 382 and 384. If the device does not require servicing, gate 384 is conditioned and a pulse is passed to scan lower priority channels in a similar manner on line 400. However, if the device does require servicing, the MT 6 pulse is passed by gate 382 to clear the Sync flip-flop 388 (as the word will be transferred) and also sets the Scan flip-flop 140 associated with the device.

The next MT 9 pulse is then passed by gate 404 through OR circuit 170 to sample the gates 172 and 174 associated with the Write and Read flip-flops 152 and 154 respectively. The pulse, passed by one of these gates through OR circuit 180 provides a Scan Active signal to the Central Processing Element and also sets the Scan Status flip-flop 122, thereby inhibiting further scans until the data cycle is completed.

As the Relocate flip-flop 136 and the Push Button Load flip-flop 184 are cleared the NOT AND circuit 406 has an output which conditions gates 408 and 410. If a Write operation is to be executed, the gated MT 9 pulse passed by gate 172 is passed by gate 408 and through OR circuit 188 to set the BAR 108 to the address of the Tape Adapter Bookkeeping Word, and to initiate a Memory Request via OR circuit 360 and decoder 362; through OR circuit 190 as a Set Break Cycle 1 FF pulse; and as a Set Write Break Control FF pulse. On the other hand, if a Read operation is to be performed, gate 174 is conditioned and the MT 9 pulse is passed through gate 410 to sample the status gates 418 and 420 associated with the Store Identity flip-flop 156 and to the Break Control Unit 106 to set the Read Break Control flip-flop and the Break Cycle 1 flip-flop. If the operation is in the status mode, gate 420 is conditioned and a pulse is passed through OR circuit 188 to set the BAR to the address of the Tape Adapter Bookkeeping Word and also to generate a Memory Request pulse through OR circuit 360. However, if the Store Identity mode is specified, gate 418 is conditioned, the pulse is passed to clear the Store Identity control flip-flop 156, to set the BAR to the IABW address to request a memory through OR circuit 360 and to set the Store Identity Control flip-flop in the Break Control circuitry.

The Break Control Circuitry for data cycles includes a portion of that utilized in relocation cycles and is shown in simplified logic form in FIG. 8. After the Break Cycle 1 Control flip-flop 201 is set by a pulse on line 184, a Memory Available pulse on line 450 samples gate 452 and is passed to set the Data Cycle Break Control flip-flop 454. The resulting outputs from flip-flops 201 and 454 condition the NOT AND circuit 456 to provide an output which conditions inverter 458 and gates 460–463. Gate 466 also is conditioned by a level from I/O typewriter circuitry hereinafter described in greater detail. If the Read Break Cycle Control flip-flop 470 has been set (by a pulse on line 422) the NOT AND circuit 472 is also conditioned when flip-flop 201 is set to apply conditioning output levels to gates 474–476. In either mode, at MT 4 time a pulse is passed through gate 460 to clear the I/O Register 110, the I/O Address Counter 100 and the I/O Word Counter 112. The Bookkeeping Word is transferred from the addressed memory to the I/O Register between MT 6 and MT 9. The MT 9 pulse transfers the address portion of the I/O Register contents to the Address Counter via gate 463 and the word count portion in complement form to the Word Counter via gate 466. At MT 11 time, a pulse is passed by gate 462 as a Memory Request pulse for the I/O Address Counter address. In a read operation gates 474–476 are also conditioned and thus in cycle 1, at MT 10 time the I/O Register 110 is cleared; at MT 11 the contents of the selected Buffer 36 are transferred to the I/O Register and at MT 12 time gate 478 is sampled. That gate is conditioned when the Store Identity Control flip-flop 480 is in set condition (identity mode) and passes a pulse to clear flip-flops 201, 454 and 480 and to set Break Cycle 3 flip-flop 203. Otherwise, Break cycle 1 is terminated by an MT 14 pulse passed by gate 461 which clears the flip-flops 201 and 454 and sets the Break cycle 2 flip-flop 202.

During the second break cycle a data word is transferred either to or from the specified memory through the I/O Register to the Buffer 36 of the selected device. The Word and Address Counters are also updated (stepped by ONE) and a Memory Request from the BAR is initiated. When the flip-flop 202 is set, gate 490 is conditioned to pass a Memory Available pulse which sets the Data Cycle Control flip-flop 454 and enables NOT AND circuit 492 to provide a conditioning level to gates 494–498 and to Inverter 500. The output of Inverter 500 is applied to NOT AND circuits 502, 504 and 506. In the Read mode NOT AND circuit 502 then conditions gate 508; in the Write mode NOT AND circuit 504 then conditions gates 510 and 512; and NOT AND circuit 506 conditions gates 514–516 when Typewriter A/N flip-flop 518 is set. As all these gates may be conditioned only in the absence of a signal from Inverter 500, they thus may be conditioned only when flip-flop 202 is set, i.e., only in Break Cycle 2.

In each Break Cycle 2, the MT 5 pulse is passed by gate 496 to step the I/O Word Counter and the Address Counter (updating their contents for the control of the next data transfer—the Address Counter then specifying the next memory address and the Word Counter specifying the number of words remaining to be transferred). Whenever the word counter is stepped to ZERO, an End Carry pulse is generated and passed by gate 196 (FIG. 5) to terminate the data transfer operation with the selected device. An MT 8 pulse, passed by gate 494, initiates a BAR memory request. The I/O Register is cleared by an MT 11 pulse passed by gate 495. The MT 12 pulse is passed by gate 498 to transfer the contents of the I/O Address Counter to the I/O Register and (via gate 520) to transfer the contents of the I/O Word Counter to the I/O Register. Then, the MT 14 pulse passed by gate 497 sets Break Cycle 3 flip-flop 203 and clears flip-flops 202 and 454.

With reference to the other gates which may be conditioned during Break Cycle 2: in the Read mode the output from NOT AND circuit 502 conditions gate 508 which passes an MT 4 pulse to transfer the contents of the I/O Register to the specified Memory Buffer Register; in the Write mode NOT AND circuit 508 conditions gate 510 which passes an MT 3 pulse to clear the I/O Register 110 and the Buffer 36, and gate 512 which passes an MT 10 pulse to transfer the contents of the I/O Register to the Buffer as the data word has been transferred in between MT 6 and 9 time; and NOT AND circuit 506 conditions gates 514–516 which function only during I/O Typewriter operations, discussed hereinafter.

During Break Cycle 3 the updated Bookkeeping Word is transferred back to its assigned location in memory. A Memory Available pulse, passed through the gate 522 conditioned by flip-flop 203 sets flip-flop 454. The resulting output level conditions NOT AND circuit 524 to provide a conditioning level to gates 526–528. The Bookkeeping Word in the I/O Register is transferred to the specified Memory Buffer Register by an MT 4 pulse passed by gate 528. The Bookkeeping Word thus is extracted from its assigned memory location during Break Cycle 1, data is transferred and the Bookkeeping Word updated during Break Cycle 2, and the updated Bookkeeping Word is returned to its assigned location during Break Cycle 3.

The SLO hold flip-flop 530 is sensed during Break Cycle 3 to permit a SLO instruction to be processed before another data cycle is initiated. (It will be recalled that the SLO instruction was placed in a HOLD condition—preventing further instruction processing by the computer—if the PCE was active. As this condition holds the Arithmetic Element, it is desirable to remove it at the earliest possible time.) If the SLO hold flip-flop 530 is clear (no SLO instruction awaiting execution) an MT 5 pulse will be passed by gates 525 and 532 through OR circuit 534 as an End Data Cycle signal on line 274. The pulse passed by OR circuit 534 clears the flip-flops 530, 203, 468, 470 and 454 (FIG. 8) clears the Scan flip-flop 140 and the Scan Status flip-flop 122 (FIG. 5) so that a Scan pulse (MT 6) can be passed for servicing the Scan channels. However, if flip-flop 530 is set the Scan Status flip-flop 122 will not be cleared by the MT 5 pulse but rather an MT 10 pulse will be passed by gates 526 and 536 and applied to the OR circuit 534 for clearing the flip-flops and generating an End Data Cycle pulse on line 274. In addition, the SLO control flip-flop in the Central Processing Element 10 is also cleared by a pulse on line 538. Thus the SLO instruction which had been placed in a hold will be initiated at CYO time before the next data cycle can be initiated.

I/O Typewriter control

In general all of the I/O devices are controlled in a similar manner and employ similar data cycles. The I/O typewriter will be utilized as a second example of the type of data transfers that are controlled by the circuitry of the invention. It has the facility for certain additional operations which afford greater flexibility in data transfer operations. The I/O typewriter can be operated either in an alphanumeric (fixed) or an octal (variable) mode. FIGS. 9 and 10 illustrate the input and output data flow paths respectively. FIG. 11 is a logic diagram (similar to FIG. 5) of the selection and transfer control logic associated with that typewriter and FIG. 12 is a simplified logic diagram of the typewriter data transfer control.

The data transfer path from the I/O typewriter 32 to a memory is indicated in FIG. 9. Each character entered by the typewriter keys 550 in the octal mode applies three bits to the encoder 552 and in the alphanumeric mode applies six bits to the encoder. These bits are applied to the associated Buffer Register 36 and when that is full (or an Enter Computer push button at the typewriter is depressed) a Word Available signal requests servicing of the Buffer and the word is transferred through the time-shared I/O Register 110 to the address specified by the Bookkeeping Word. The data transfer path from memory to typewriter is indicated in FIG. 10. When the Buffer 36 is empty a Word Demand signal initiates loading of a word into the Buffer through the I/O Register 110 from the memory address specified by the Bookkeeping Word. The word is then channeled by bytes (6 bits) through a gate matrix 554, a character register 556 and an encoder 558 to the typewriter magnets 560. Data transfers to I/O devices, including the typewriter, are described in greater detail in the above-referenced copending application, S.N. 79,809 and additional information may be obtained therefrom if desired.

The logic which controls the I/O typewriter selection and transfer operations is shown in FIG. 11 and it will be noted that there are common elements shared with other I/O devices. Such elements have been assigned the same reference numerals that those elements have in FIG. 5. In addition other elements perform similar functions but are individually associated with an I/O device. These elements have been assigned a primed reference numeral in FIG. 11. Elements unique to the I/O typewriter logic include the Word Counter Step Control flip-flop 562 and the First Word Control flip-flop 564, and logic associated therewith. This unique logic is utilized in Read operations (entry of data into the CPE).

When used as an input device data is transferred from the typewriter 32 under manual control either in the alphanumeric (A/N) or in the octal mode. The data cycle for the alphanumeric mode consists of three machine cycles with a modified first data cycle as it references a Fixed Mode Bookkeeping Word (FMBW) which is similar to the word other I/O devices relocate during the relocation cycle. The FMBW is stored under program control in an addressable location prior to manual operation of the I/O typewriter in the A/N mode and no relocation cycle is required. This arrangement, which stores the control or bookkeeping word in an addressable location, rather than being wired into the machine as is the case in prior art machines, gives the programmer easy access to the value and enables him to revise the memory locations allocated to alphanumeric I/O typewriter data entries. This FMBW contains a zero word count and the starting address for the message to be stored in the memory. In the first machine cycle of the First Break Cycle the FMBW is obtained. The second machine cycle is used to store the data word in the location specified by FMBW and to update the address and word count portions. In these operations the word counter is stepped up from ZERO. During the third machine cycle the updated FMBW is stored in the Typewriter Bookkeeping Word (TWBW) Address. In this manner the FMBW remains in its original form in its address and controls I/O Typewriter A/N operations in that form until modified by the computer program. When thirty-two words have been transferred the keyboard of the typewriter is locked, ending the alphanumeric operation.

To initiate the alphanumeric input operation a push button at the typewriter is depressed and generates a pulse which is passed by gate 570 (FIG. 11) if the I/O typewriter is available and sets the Typewriter Interlock flip-flop 120', the Read flip-flop 154' and the First Word flip-flop 564. The Typewriter Buffer 36 and a keyboard lock flip-flop (not shown) are also cleared. With reference to FIG. 12 the pulse is also applied on line 572 to clear the octal flip-flop 574 and the octal switch flip-flop 576 and on line 578 to set the byte 1 flip-flop in the control ring 580. This control ring conditions one row of cores 581–588 in the gating matrix 590 at a time. (A typical row of cores is shown in greater detail in FIG. 12a.)

Depressing one of the typewriter keys sets a core (or cores) in the encoder 552. After the character key is released an encoder read out pulse applied on line 592 is passed by gate 594, (which is conditioned by the cleared Computer Select flip-flop 596—an interlock which prevents simultaneous input and output operation attempts), to the encoder so that the encoded six bit output is transferred to the gating matrix 590. This matrix consists of eight sets of cores, seven sets being biased by the signals from the control ring 580 to inhibit transfer of information. The conditioned set passes the byte pulse into the Buffer 36 over cable 598. The encoder read out pulse is also applied to delay unit 600 and after the byte has been transferred to the Buffer it is passed by gate 602 as a control ring stepping pulse.

Data can be entered into the computer any time after a byte has been transferred to the Buffer 36. When the Buffer is full (eight bytes entered) the typewriter keyboard is locked (by an end carry on line 604 from the counter 580) and a Word Available pulse is generated which initiates a data transfer cycle to transfer the contents of the Buffer through the I/O Register 110 to the memory specified by the FMBW.

With reference now to FIG. 11 the Word Available pulse sets the Buffer Status Sync flip-flop 388'. The next MT 5 pulse from Time Pulse Distributor 58 via the Break Control Distributor 160 samples gate 390', and is passed to set the Buffer Status flip-flop 386′. The Scan Channel gates 382′, 384′ are sampled by an MT 6 pulse (assuming all higher priority devices do not require servicing) which is passed by gate 380. As gate 382′ is conditioned the Scan pulse is passed to clear the Sync flip-flop 38′, and to set the Scan flip-flop 140′. The setting of the Scan flip-flop enables NOT AND circuit 178′ to condition the Write gate 174′ and the MT 9 pulse, passed through gate 404 and OR circuit 170, is passed to sample the Read First Word flip-flop 564, to set the Positive Word Counter Step flip-flop 562, through OR circuit 606 to set the Scan Status flip-flop 116 (turning off the Scan), and as a Scan Active signal to the Central Processing Element. As the flip-flop 564 is set the pulse passed by gate 603 clears that flip-flop, sets the Read Control flip-flop 422 (FIG. 8), and also samples gates 612 and 614. Gate 612, conditioned by an Alphanumeric Mode level from the Typewriter controls Circuitry 32, passes the pulse to the Break Controls 106 to set the flip-flops 201 and 518 (FIG. 8); through OR circuit 360 as a BAR Memory Request pulse; and to set the BAR 108 to the address of the Fixed Mode Bookkeeping Word.

The Break Control initiates a data cycle as described above. During the first cycle the I/O Register 110 is cleared, the Fixed Mode Bookkeeping Word is transferred from the address specified by BAR 108 to the I/O Register, the address portion thereof is transferred to the Address Counter 100 and the word count portion is transferred to the Word Counter 112 in normal rather than complement form (via gate 464—FIG. 8 which is conditioned by the set flip-flop 562 (FIG. 11)), the I/O Register is cleared, and the contents of the Typewriter Buffer 36 are transferred to the I/O Register. During the second cycle the BAR is cleared; the data word is transferred from the I/O Register to the Memory Buffer Register specified by the Address Counter 100; the Word and Address Counters are stepped; the BAR is set to the Typewriter Bookkeeping Word Address; a BAR Memory Request pulse is generated; the Alphanumeric Break Control flip-flop 518 (FIG. 8) is cleared; the I/O is cleared; and the updated contents of the Word and Address Counters are transferred to the I/O Register. During the third Break cycle the updated Bookkeeping Word is transferred from the I/O Register to the Memory Buffer Register specified by the BAR (to be returned to the TWBW address rather than the FMBW address) and an End Data Cycle pulse is generated which clears the Scan flip-flop 140′, the Positive Word Counter Step flip-flop 562, and the Scan Status flip-flop 116.

After the word has been transferred, the Buffer 36 is cleared, the control ring 580 (FIG. 12) set to byte 1 and the keyboard is unlocked to allow the operator to type the next word into the Buffer 36. Thirty-two words may be entered in this mode and then a Word Counter pulse on line 616 (FIG. 11) samples gate 618 which is conditioned by an output from the set flip-flop 562 and is passed to sample gate 620. As the A/N mode is selected the pulse is passed to clear the Read flip-flop 154′ and as a Slot Full signal to the Typewriter Control 32.

In the Octal mode (variable) data is entered into the Central Processing Element in octal form from the Typewriter. The preferred embodiment of the invention requires that the Central Processing Element be in the Computer Test mode during this operation (to avoid conflicting storage of data as the operator may enter data in memory without any restriction in this mode). Any number of words may be transferred to the memories and those transferred words are stored in locations specified by the Bookeeping Word that is entered via the Typewriter as the first word in this mode. The octal operation utilizes only three bits ($2^0$, $2^1$, $2^2$) per character and thus two characters form a byte. The first word entered into the Buffer is the starting address for the following entered data words and is stored in the Typewriter Bookkeeping Word address (in contrast with the FMBW address) in the right half portion of that word (bytes 5–8).

The octal switch flip-flop 576 controls the read out of of the octal characters via gate drivers 624, 626 to the matrix 590. The flip-flops 574, 576 are initially set by a signal on line 628 (generated when the octal mode is selected) and the control ring is initially set to byte 5 by a pulse on line 622 (FIG. 12). (The control logic (FIG. 11) is also set up in substantially the same manner as for the alpha-numeric mode operation.) When the first character is read out of the encoder the delayed pulse is passed by the conditioned gate 630 to complement flip-flop 576 so that gate 602 and gate driver 626 become conditioned. When the second character is read out the delay pulse is passed by gate 602 to step the byte counter control ring 580 by byte 6 and again complements flip-flop 576. After four words are entered into the Buffer 36 the End Carry pulse sets a Word Available flip-flop. The typed word may be checked and then the Enter Computer push button, when depressed, generates a pulse that clears the control ring 580 and (after the buffer has been parity checked) a Word Available pulse sent to the Scan element initiates a data cycle.

During the first data cycle the entered Memory Address is transferred from Buffer 36 through the I/O Register 110 to the Typewriter Bookkeeping Word Address; the Buffer 36 is cleared; the Control Ring 580 is set to byte 1 and the keyboard is then unlocked to allow additional data to be typed. Thus the only transfer is of the entered word to the TWBW address as a Bookkeeping Word which specifies the starting address for subsequent entered words. Subsequent data cycles require three break cycles in which data is transferred to successive locations in the specified area and the Bookkeeping Word is updated. The final Bookkeeping Word contains the last address and the number of words entered.

The first Octal data transfer cycle is initiated in the same manner as the A/N transfer cycle above described. However, the gated MT 9 pulse that sets the Read Break Control flip-flop 470 (FIG. 8) is passed by gate 614 (FIG. 11) rather than gate 612 to set the BAR to the TWBW address and also sets the Octal Control flip-flop 632 (FIG. 8) but Break Cycle 1 flip-flop 201 is not set. The BAR Memory Available pulse is passed by the conditioned gate 634 to set the data cycle flip-flop 454 and NOT AND circuit 636 then conditions gates 638 and 640. The MT 2 pulse is passed by gate 638 to clear the I/O Register and also sets the Break Cycle 3 flip-flop 203. The MT 3 pulse is passed by gate 640 to transfer the Bookkeeping Word address portion in Buffer 36 to the I/O Register 110 and also clears the Octal Control flip-flop 632. As NOT AND circuit 524 now has a conditioning output, the MT 4 pulse is passed by gate 528 to transfer the contents of the I/O Register to the Memory Buffer Register specified by the BAR 108. The MT 5 pulse is then passed by gate 527 as an End Data Cycle pulse if the SLO hold flip-flop 530 is not set. (If the SLO hold flip-flop is set the End Data Cycle pulse is delayed until MT 10 time as above described.)

Gates 612 and 620 are conditioned only for the first word transfer in the Alphanumeric Mode and gate 614 is conditioned only for the first word transfer in the Octal Mode. Subsequent word transfers the memory, require the normal three break cycles and are under the control of the word in the Fixed Mode Bookkeeping Word address or the Typewriter Bookkeeping Word address, respectively.

When the I/O Typewriter is used as an output device a SLO instruction is programmed, selecting the typewriter for a Write operation. A relocation cycle loads the Bookkeeping Word into the assigned address and generates a false Word Demand pulse, initiating a data cycle to load the Typewriter Buffer 36. Following data words are then transferred from memory to the typewriter in break cycles under the control of the data cycle break controls. Data may be transferred in either Alphanumeric or Octal form depending on the mode selected by the instruction. The Alphanumeric mode types one character (6 bits) per byte and spacing and carriage return functions must be programmed in the apparatus of the preferred embodiment. When the Octal mode is selected two characters per byte are typed with automatic spacing between words and automatic carriage return after seven words.

Two other operations of which the apparatus of the described embodiment is capable will be discussed briefly. These operations are not discussed in detail herein and additional information on such operations may be obtained, if desired, from the aforementioned copending application, Serial No. 79,809. In each SLO instruction, after the Operation Register 102 (FIG. 5) has been loaded, the Operate bits of the modifier field are checked prior to a Relocation cycle as that mode is used to initiate actions within the tape system and control words are not required. If Operate mode bits are decoded the Operate flip-flop 132 is set and the instruction is transferred to the tape adapter and tape drive to be directly executed (without relocation). The SLO start pulse samples the decoder 118 and generates a pulse which samples gate 150 to clear the Scan Status flip-flop 116, turning on the Scan, and also is passed as a Select pulse to the tape control unit 30 and to read out the Decoder 148 so that an operation may be performed in accordance with the instruction.

Push Button Load operations are initiated from the operator's console 648. These operations involve the transfer of data to the Central Processing Element in response to push button actuation. When the Tape Adapter push button is depressed, for example, the Push Button Load flip-flop 134, the First Word flip-flop 184 and the Read flip-flop 154 are set (FIG. 5), the I/O Register 110 is cleared and the Tape Unit is started to load the Buffer 36. When the data has been loaded into the Buffer 36 the Scan unit initiates a data transfer and a gated MT 9 pulse, passed by gate 650, clears flip-flop 184, sets the Address Counter 100 to a preassigned address ($40_8$) (for a memory request) sets flip-flop 652 in the Break Control (FIG. 8) and transfers the contents of the Buffer 36 to the I/O Register 110. The MT 15 Memory Available pulse then is passed by gate 654 to set flip-flop 454 so that gate 656 becomes conditioned and the MT 2 pulse is gated to clear flip-flop 652 and set Break Cycle 2 flip-flop 202. In Break Cycles 2 and 3 the data word from I/O Register 110 to the specified memory area, the Address Counter 100 stepped and the updated control word stored in the Bookkeeping Word address specified by the BAR 108. The specified number of additional words are then transferred in the normal (above-described) data cycles.

In summary, the apparatus of the described embodiment provides an efficient data transfer control system between a high speed digital computer and a plurality of peripheral data handling devices. The apparatus utilizes time shared logic (with accompanying equipment savings) in a coordinated manner so that data transfers are performed at substantially the maximum possible speed and accommodates several different types of data transfer initiation operations. Each computer controlled data transfer is initiated by a single programmed instruction, thus facilitating programming operations and improving the utilization of available computer time. The address portion of the single instruction identifies the location of data transfer control (bookkeeping) information (which thus may be stored in any addressable location rather than a specific location as has been the case in prior apparatus). In executing the instruction the computer first senses for the availability of the control system and when the control system is available the pertinent portions of the instruction are transferred thereto and the computer continues processing its program.

The control system then interlocks the selected data handling device and transfers the control word(s) from the specified address(es), places them in assigned locations relative to the selected device and commences the data transfer. The system permits several of the data handling devices to be selected for data transfer operations at the same time and sequentially transfers data in accordance with the several instructions under the control of and through time-shared circuitry. No significant amount of time is lost as the speed of these devices for processing data is much slower than the speed with which a transfer can be executed.

The data transfers are under the control of the relocated Bookkeeping Words which are updated during each transfer to provide a current record of the progress of the transfer specified by the initiating instruction. For the most part these transfers proceed without interrupting the execution of the stored program by the computer due to the provision of several simultaneously addressable memory areas.

In addition, the system accommodates manual entry of data into the computer. In one mode data may be entered in any location that the operator desires while in another mode a limited amount of data may be entered in a memory area that is controlled by the program so that efficient and flexible use of the memories is possible. The system retains a control word in original form and simultaneously permits the word value to be updated in data transfer control operations.

Thus it will be seen that the invention provides a flexible and versatile system which both simplifies and expedites data transfers between the computer or other similar devices. While the invention has been particularly shown and described with reference to a preferred embodiment thereof, it will be understood by those skilled in the art that various changes in the form and details may be made therein without departing from the spirit and scope of the invention.

What is claimed is:

1. Apparatus for controlling transfer of data between a digital computer and a plurality of peripheral data handling devices, each said device including means for providing a readiness indication, said computer being adapted to process substantially continually binary coded data in accordance with a stored program of binary encoded instructions, and having memory means comprising a multiplicity of addressable memory locations for the storage of said data and instructions and each said peripheral data handling device having an addressable control information storage location in said memory means permanently assigned to it, comprising a common data transfer path between all of said peripheral data handling devices and said memory means, said data transfer path including a storage register into which all data words transferred to and from said memory means are temporarily stored, data transfer controlling instruction having an operand portion which identifies a particular data handling device and an address portion which identifies a memory location in which control information for use during the data transfer operation is stored, said instruction responsive means being adapted to select the specified device and to transfer said control information from said identified memory location to the assigned memory location of the selected device, said control information specifying the number of data words to be transferred and the area in said memory means to be utilized in said transfer, word counter means and address counter means, said word counter means being adapted to receive the portion of said control information which controls the number of data words to be transferred in response to a single instruction and said address counter means being adapted to receive the portion of said control information which specifies the location in said memory means with which each data word transfer is to be made, means operative independently of the data processing operation of said computer to sense the readiness indication of the selected data handling device for a data word transfer, means responsive to a sensed readiness indication from the selected data handling device to transfer control information stored in the memory location assigned to said selected device to said word and address counters to control the transfer of a data word between that device and the memory area specified by said control information, means common to said plurality of data handling devices and operative in response to each data word transfer to revise said control information in preparation for the next data word transfer including means to step both of said counter means in response to each data word transfer, and means to return said control information to said assigned memory location immediately after the data word transfer.

2. The apparatus as claimed in claim 1 and further including manual data entry means associated with one of said peripheral data handling devices for enabling an operator to enter data via said one device and said common data transfer path into a selected area of said memory means for use by said computer, and means to control said word counter to step it in the opposite direction from the stepping direction utilized in computer controlled data transfers to provide an indication of the number of words entered into said memory means through said manual data entry means.

3. The apparatus as claimed in claim 2 wherein said manual data entry means is selectively operative in first and second modes, and further including means responsive to selection of said first mode adapted to relocate control information from a first addressable memory location assigned to said one device to a second memory location also assigned to said one device when the first data word is available for entry by said device and means responsive to selection of said second mode to transfer the first entered data word to said addressable location for use in controlling the transfer of subsequently entered data items to said memory means.

4. In combination, a plurality of data handling devices, each said device including means for generating a signal indicating the readiness of that device for a data word transfer, a computer, an addressable storage unit,
   said unit storing manifestations of data, instructions and data transfer control commands,
   each of said instructions including an operand portion and an address portion and each of said data transfer control commands including a word count part and an address part,
   a shared data transmission channel connecting said plurality of data handling devices and said storage unit including a data register for receiving data manifestations from said data handling devices to be relayed to said storage unit or data manifestations from said storage unit to be relayed to said data handling devices,
   a word counter shared by said plurality of data handling devices for storing manifestations of said data transfer control command word count part,
   an address counter shared by said plurality of data handling devices for storing manifestations of said data transfer control command address part,
   and an operation register for storing a plurality of instruction operand portions corresponding to said plurality of data handling devices,
   means controlled by an operand portion of one instruction for selecting a data handling device,
   means controlled by the address portion of said one instruction for selecting a data transfer control command in said storage unit,
   means controlled by said one instruction operand portion for transferring said word count part of said selected command to said word counter,
   and said address part of said selected command to said address counter,
   means for storing said one instruction operand portion in said operation register, means for stepping said word counter down and said address counter up in response to each data word transfer to control the flow of data between addresses in said storage unit designated by said address counter and the data handling device selected by the operand portion of said instruction stored in said operation register,
   means for storing the revised contents of said word counter and said address counter externally of said counters until the selected data handling device indicates readiness for another data word transfer,
   means responsive to said readiness indication to return said revised contents to said counters to control the next data word transfer,
   and means controlled by said word counter to terminate the data transfer between said storage unit and the data handling device selected by said stored instruction operand portion.

5. Apparatus for controlling transfer of data between a digital computer and a plurality of peripheral data handling devices, said computer being adapted to process substantially continually binary coded data in accordance with a stored program of binary encoded instructions and having memory means comprising a multiplicity of addressable memory locations for the storage of said data and instructions, each said instruction including an operand portion and a single address portion, each said peripheral data handling device including means for generating a signal indicating the readiness of that device for a data word transfer and each said device having an addressable control information storage location in said memory means permanently assigned to it, a common data transfer path between all of said peripheral data handling devices and said memory means, said data transfer path including a storage register into which all data words transferred to and from said memory means are temporarily stored, word counter means coupled to said common data transfer path and shared by said plurality of data handling devices for storing manifestations of data control information specifying the number of data words to be transferred, address counter means coupled to said common data transfer path and shared by said plurality of data handling devices for storing manifestations of data control information specifying the location in said memory means to be employed in the data word transfer, means responsive to a data transfer controlling instruction for initiating a data message transfer between said memory means and the particular data handling device identified by the operand portion of said data transfer controlling instruction, and transferring control information from the memory address identified by the address portion of said data transfer controlling instruction to the memory location assigned to said particular device, means for sequentially sensing said data handling devices for said readiness signals, means responsive to a detected readiness signal of said particular device for disabling said readiness signal sensing means and for transferring the control information stored in the memory location assigned to said particular device to said word and address counter means over said common data transfer path, means to step both of said counter means to update the contents thereof in response to the data word transfer between said particular device and the address in said memory means specified by the contents of said address counter, means responsive to an output signal from said word counter to terminate the data message transfer initiated by said data transfer controlling instruction with that data handling device, means to return said updated control information to said assigned memory location immediately after the data word transfer, and means responsive to the completion of the data word transfer to reactivate said readiness signal sensing means.

References Cited by the Examiner

UNITED STATES PATENTS

| | | | |
|---|---|---|---|
| 2,969,522 | 1/1961 | Crosby | 340—172.5 |
| 3,029,414 | 4/1962 | Schrimpf | 340—172.5 |
| 3,061,192 | 10/1962 | Terzian | 340—172.5 |
| 3,142,043 | 7/1964 | Schrimpf | 340—172.5 |

OTHER REFERENCES

Pages 2–105, 1959, Grabbe, Ramo and Wooldridge, Handbook of Automation, Computation and Control, N.Y., John Wiley & Sons Inc., vol. II.

Pages 35 and 36, 1961, Smirnov, Electronic Digital Computers, N.Y., Pergamon Press (Moscow 1958).

ROBERT C. BAILEY, *Primary Examiner.*

STEPHEN W. CAPELLI, MALCOLM A. MORRISON,
*Examiners.*